US009929747B2

(12) United States Patent
Gopal et al.

(10) Patent No.: US 9,929,747 B2
(45) Date of Patent: Mar. 27, 2018

(54) TECHNOLOGIES FOR HIGH-PERFORMANCE SINGLE-STREAM LZ77 COMPRESSION

(71) Applicant: Intel Corporation, Santa Clara, CA (US)

(72) Inventors: Vinodh Gopal, Westborough, MA (US); James D. Guilford, Northborough, MA (US); Daniel F. Cutter, Maynard, MA (US); Kirk S. Yap, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/395,702

(22) Filed: Dec. 30, 2016

(65) Prior Publication Data

US 2018/0026654 A1    Jan. 25, 2018

Related U.S. Application Data

(60) Provisional application No. 62/365,969, filed on Jul. 22, 2016, provisional application No. 62/376,859, (Continued)

(51) Int. Cl.
*H03M 7/38* (2006.01)
*H03M 7/40* (2006.01)
(Continued)

(52) U.S. Cl.
CPC ........... *H03M 7/40* (2013.01); *H03M 7/3086* (2013.01); *H04L 69/04* (2013.01)

(58) Field of Classification Search
CPC ........ H03M 7/40; H03M 7/3086; H03M 7/00; H04L 69/04
(Continued)

(56) References Cited

U.S. PATENT DOCUMENTS 8,169,352 B2 * 5/2012 Sornin ................. H03M 3/372
                                                      341/143
8,766,827 B1 * 7/2014 Milne ................. H03M 7/3084
                                                      341/51
(Continued)

FOREIGN PATENT DOCUMENTS

GB       2513987       11/2014

OTHER PUBLICATIONS

International search report for PCT application No. PCT/US2017/038323, dated Sep. 29, 2017 (3 pages).
(Continued)

*Primary Examiner* — Jean B Jeanglaude
(74) *Attorney, Agent, or Firm* — Barnes & Thornburg LLP

(57) ABSTRACT

Technologies for high-performance single-stream data compression include a computing device that updates an index data structure based on an input data stream. The input data stream is divided into multiple chunks. Each chunk has a predetermined length, such as 136 bytes, and overlaps the previous chunk by a predetermine amount, such as eight bytes. The computing device processes multiple chunks in parallel using the index data to generate multiple token streams. The tokens include literal tokens and reference tokens that refer to matching data from earlier in the input data stream. The computing device thus searches for matching data in parallel. The computing device merges the token streams to generate a single output token stream. The computing device may merge a pair of tokens from two different chunks to generate one or more synchronized tokens that are output to the output token stream. Other embodiments are described and claimed.

25 Claims, 18 Drawing Sheets

Data Center 100

Related U.S. Application Data filed on Aug. 18, 2016, provisional application No. 62/427,268, filed on Nov. 29, 2016.

(51) Int. Cl.
*H04L 29/06* (2006.01)
*H03M 7/30* (2006.01)

(58) Field of Classification Search
USPC .................................................... 341/50, 51
See application file for complete search history.

(56) References Cited

U.S. PATENT DOCUMENTS

| | | |
|---|---|---|
| 2009/0060047 A1 | 3/2009 | Schneider |
| 2014/0006536 A1* | 1/2014 | Guilford ............ H03M 7/3068 709/212 |
| 2015/0161156 A1* | 6/2015 | Zhuang ............ G06F 17/30159 707/693 |
| 2016/0112064 A1 | 4/2016 | Dalton et al. |
| 2016/0173123 A1 | 6/2016 | Gopal et al. |
| 2016/0173126 A1 | 6/2016 | Guilford et al. |

OTHER PUBLICATIONS

Written opinion for PCT application No. PCT/US2017/038323, dated Sep. 29, 2017 (8 pages).

* cited by examiner

| RULE 2004 | CONDITION 2006 | PREV TOKEN ACTION 2008 | NEXT TOKEN ACTION 2010 |
|---|---|---|---|
| 1 | next.end == prev.end | Unchanged | Drop |
| 2 | next.start < prev.start | Drop | Truncate to start at prev.start |
| 3 | next.start == prev.start | Drop | Unchanged |
| 4 | next.start > prev.start | See Rule 4 Table | |

| SUB-RULE 2014 | SUB-CONDITION 2016 | PREV TOKEN ACTION 2008 | NEXT TOKEN ACTION 2010 |
|---|---|---|---|
| 4.a | $\delta_1 > T$ && $\delta_2 > T$ | Unchanged | Truncate to reference |
| 4.b | $\delta_1 > T$ | Unchanged | Truncate to literals |
| 4.c | $\delta_2 > T$ | Truncate to literals | Unchanged |
| 4.d | ELSE | Select 4.b or 4.c based on scoring function (e.g., fewest number of literals required) | |

FIG. 20

TECHNOLOGIES FOR HIGH-PERFORMANCE SINGLE-STREAM LZ77 COMPRESSION

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

Data compression is an important computer operation used in many computing applications, including both server and client applications. For example, data compression may be used to reduce network bandwidth requirements and/or storage requirements for cloud computing applications.

Many common lossless compression formats are based on the LZ77 compression algorithm Data compressed using LZ77-based algorithms typically include a stream of symbols (or "tokens"). Each symbol may include literal data that is to be copied to the output or a reference to repeat data that has already been decompressed. The DEFLATE algorithm uses LZ77 compression in combination with Huffman encoding to generate compressed output. Typical compression algorithms such as DEFLATE may support higher compression ratios (e.g., Level 9 or L9 ratios) by performing additional computations.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 20 is a tabular diagram illustrating token merger rules that may be performed by the method of FIG. 18.

DETAILED DESCRIPTION OF THE DRAWINGS

Figure 1:
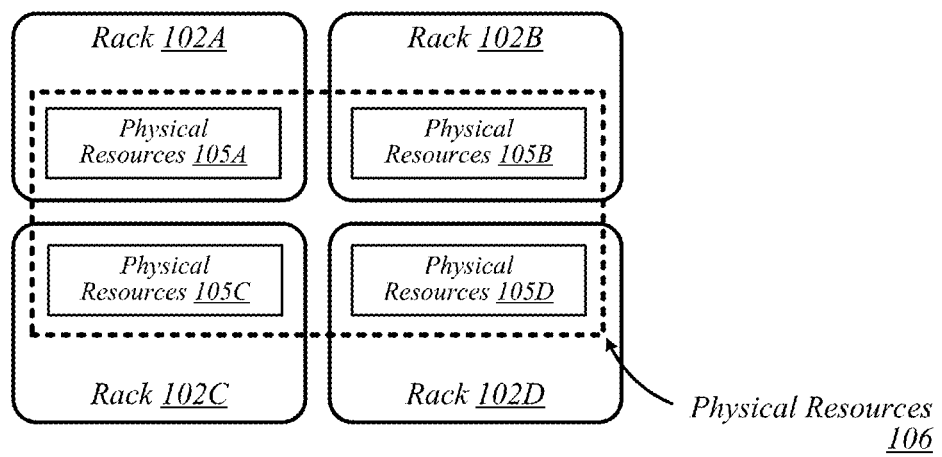
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual inline memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application-specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
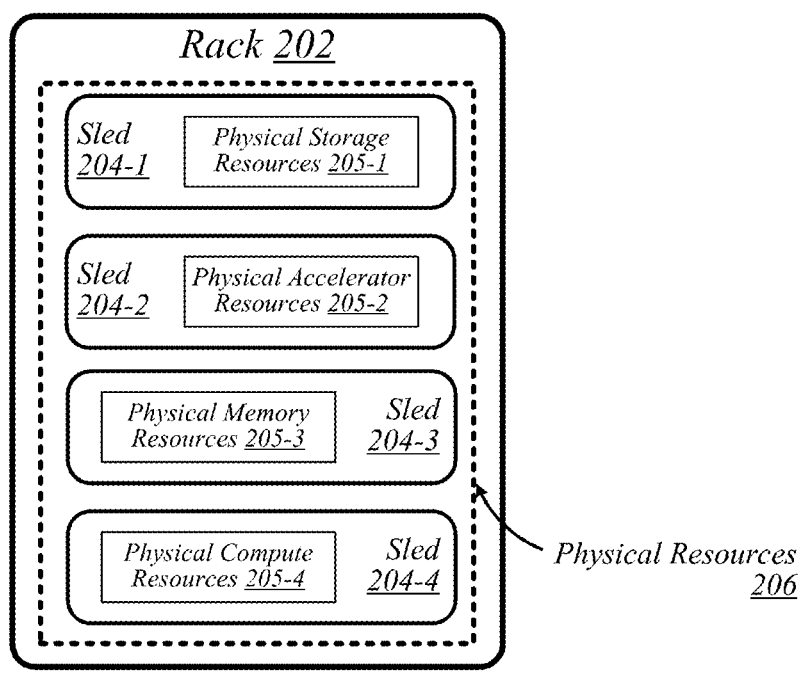
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
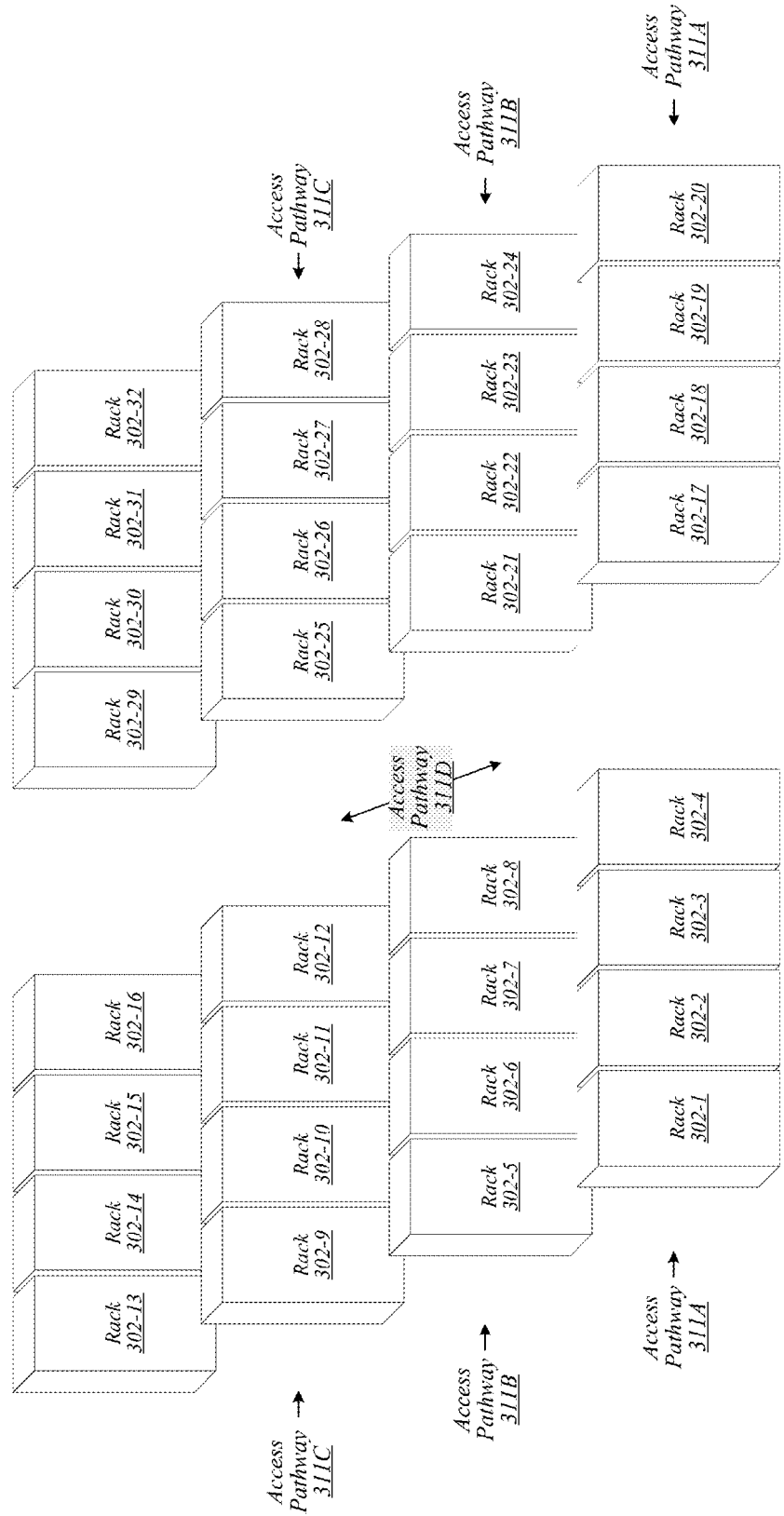
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
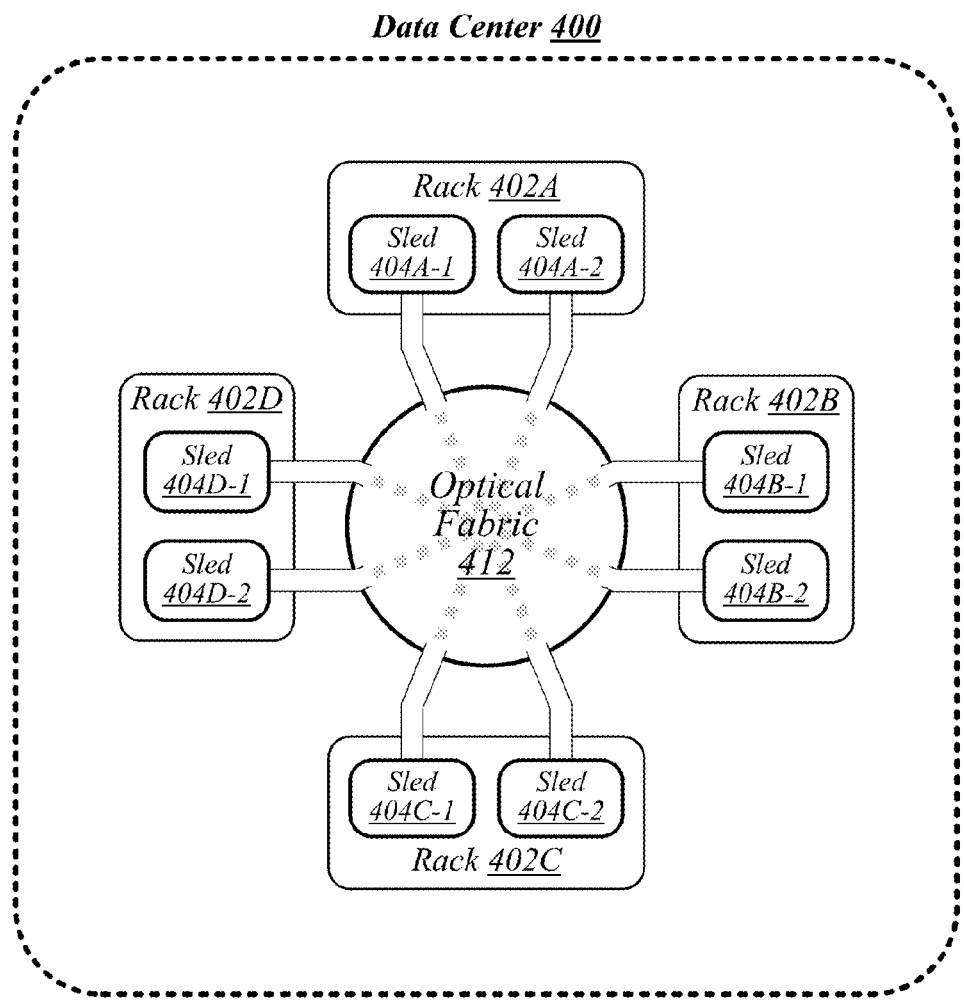
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
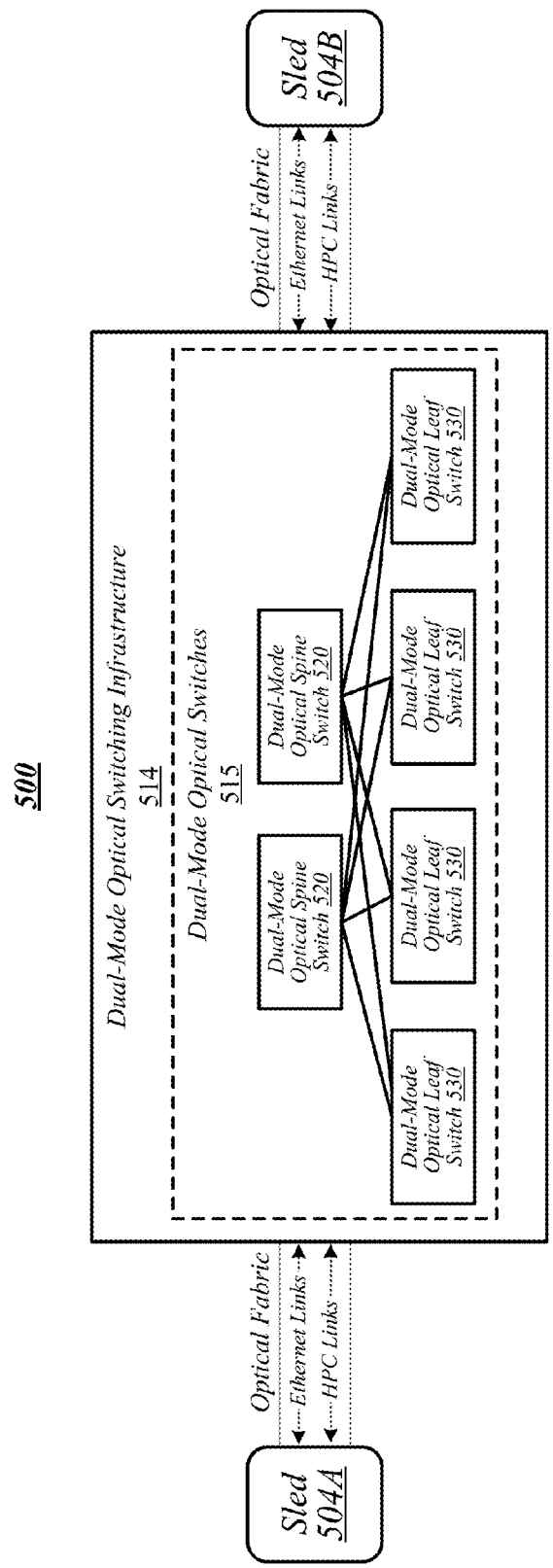
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
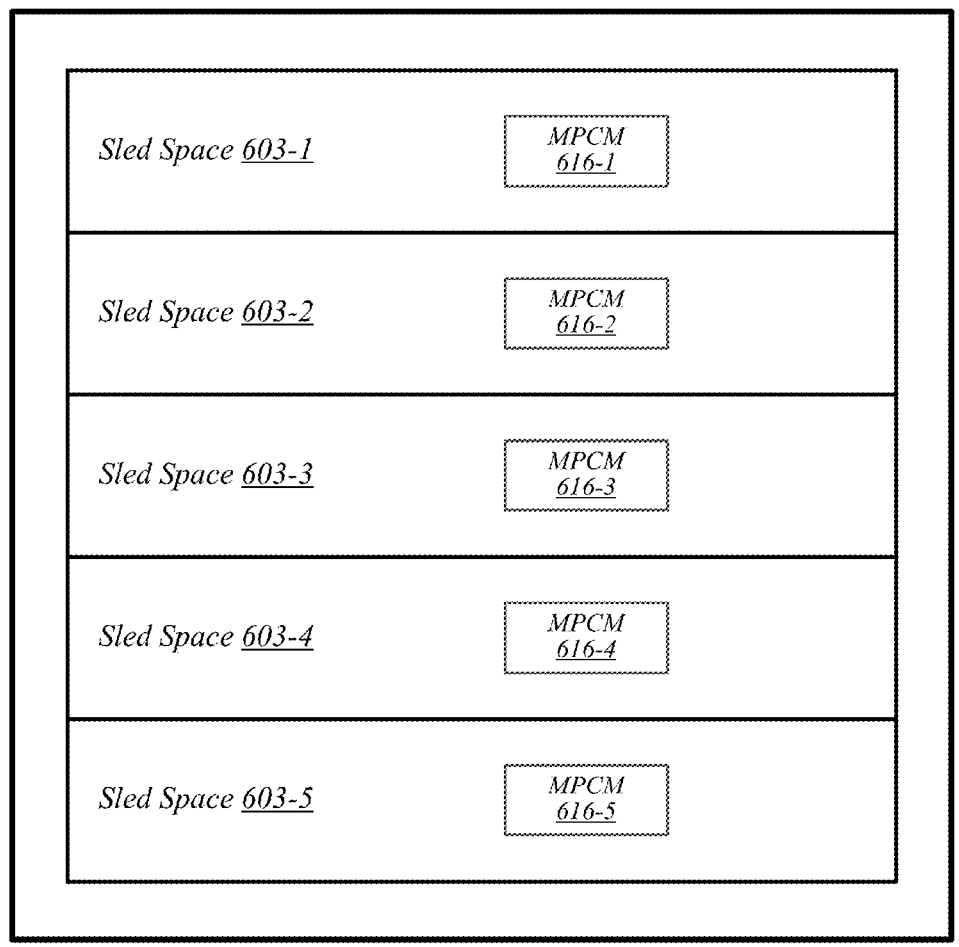
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
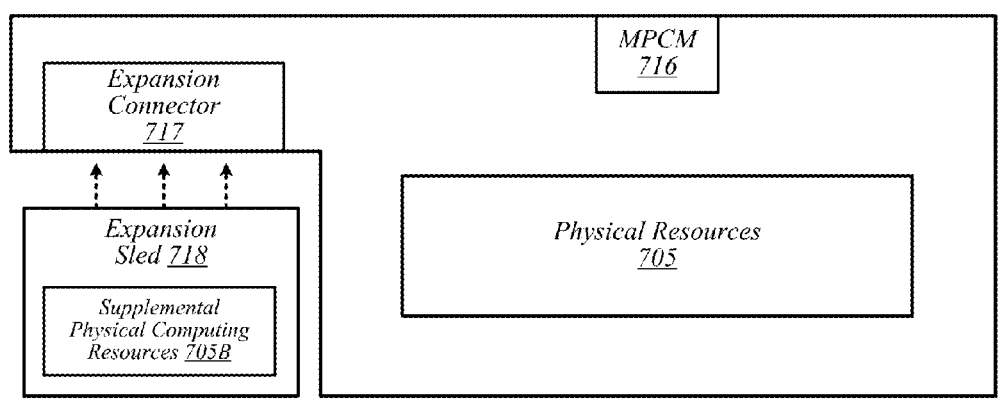
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
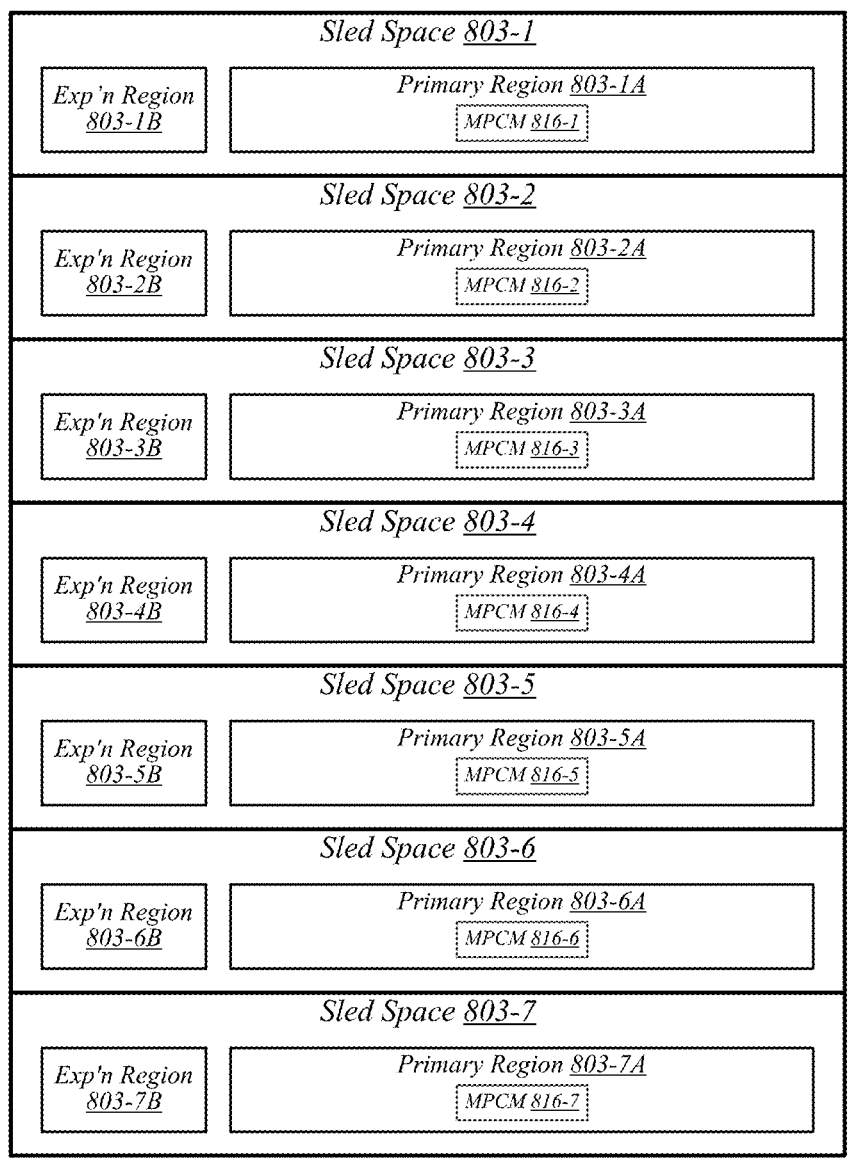
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
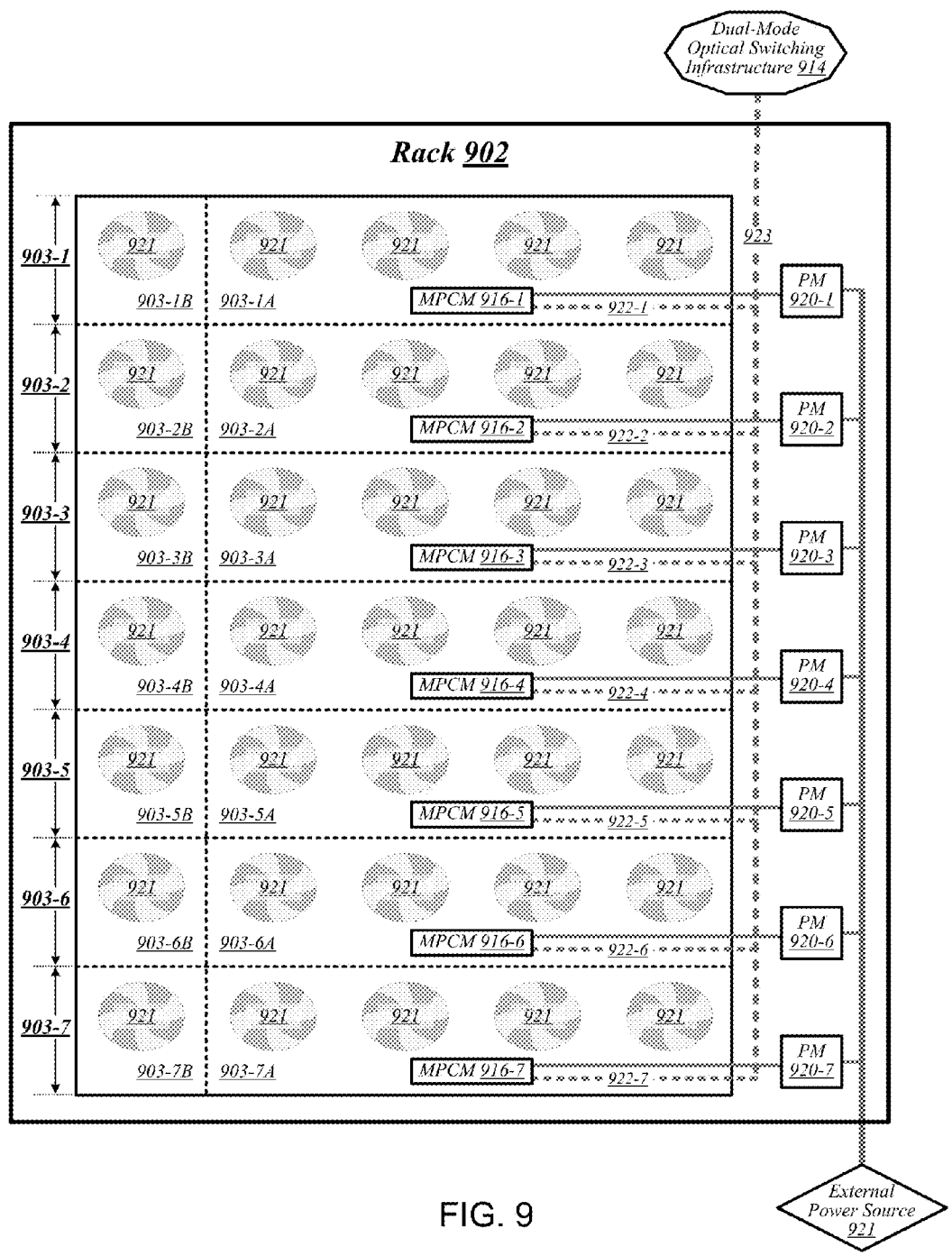
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
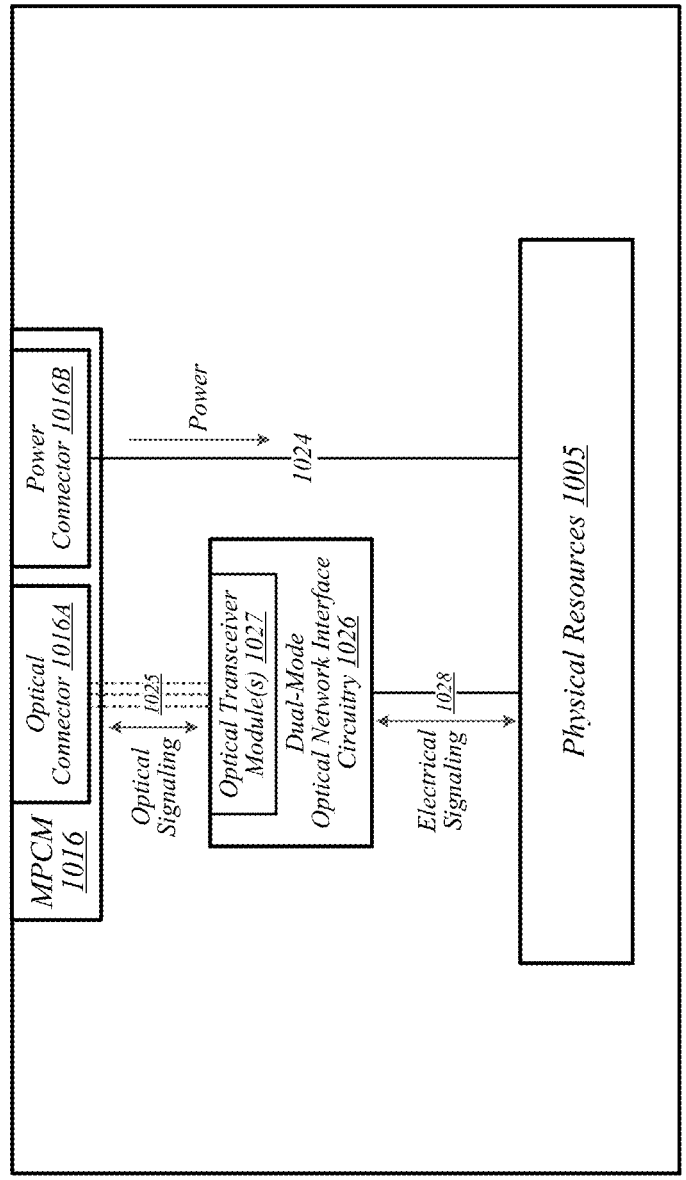
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
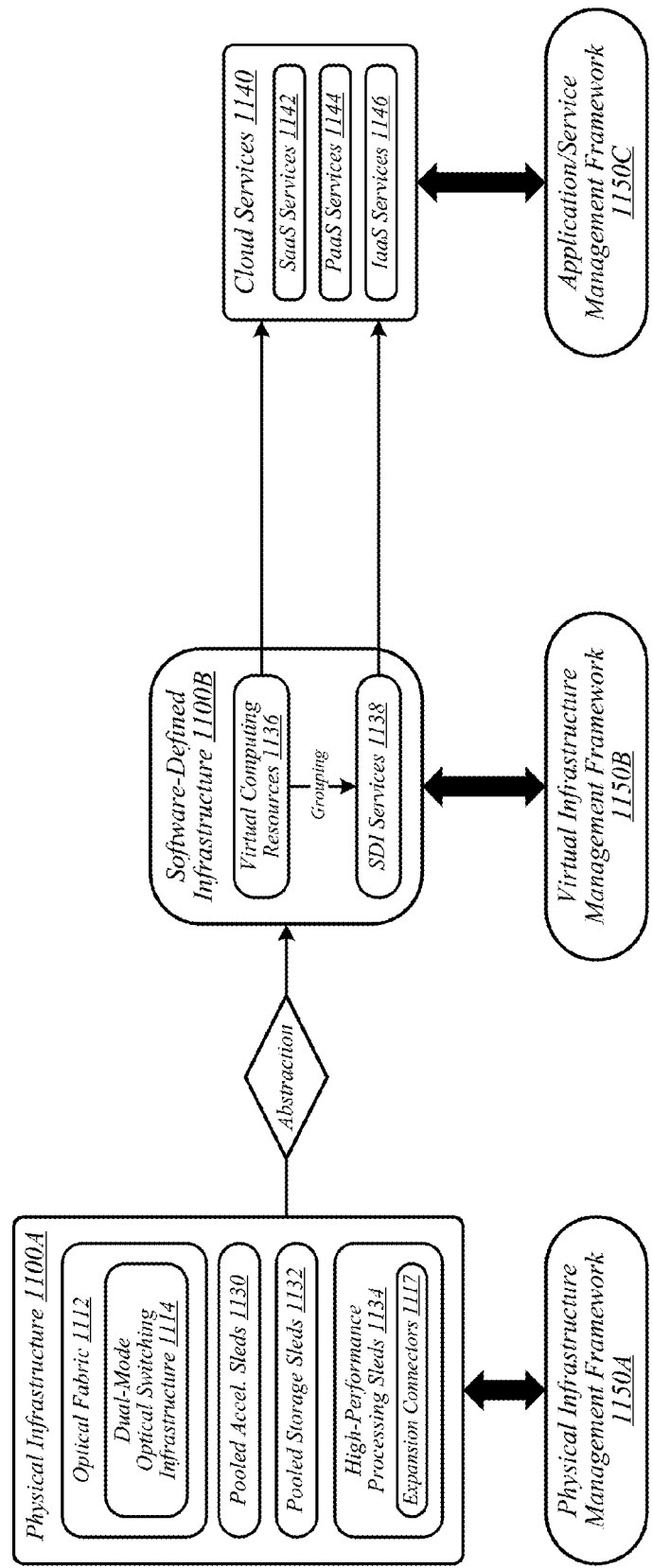
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
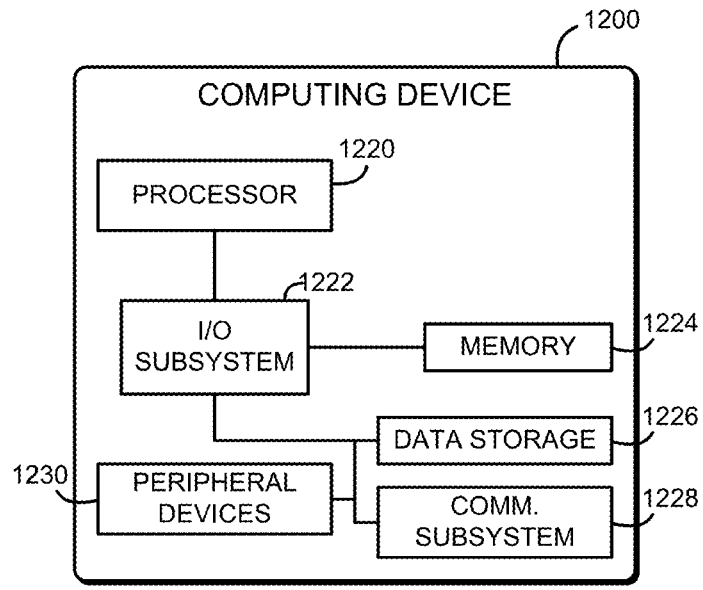
FIG. 12 is a simplified block diagram of at least one embodiment of a computing device for high-performance single-stream data compression.

Referring now to FIG. 12, an illustrative computing device 1200 for high-performance single-stream data compression includes a processor 1220, an input/output (I/O) subsystem 1222, a memory 1224, and a data storage device 1226. The computing device 1200 may be embodied as server computer, a rack server, a blade server, a compute node, and/or a sled in a data center, such as a sled 204 as described above in connection with FIG. 2, a sled of the physical infrastructure 1100A as described above in connection with FIG. 11, or another sled of the data center.

In use, as described below, the computing device 1200 divides an input data stream into relatively small, overlapping chunks. For example, each chunk may be 136 bytes long and overlap the previous chunk by eight bytes. The computing device 1200 searches for matching data in the input data stream for each chunk in parallel and generates corresponding LZ77 token streams. The computing device 1200 merges the token streams associated with each chunk into a single output token stream. The computing device 1200 encodes the token stream to generate an output data block. By performing the searches for matching data in parallel, the computing device 1200 may greatly improve matching performance. Further, as described below, the computing device 1200 preserves compression ratio even for small chunk sizes because the search for matches may use a large history and because matches may extend over chunk boundaries. Thus, the computing device 1200 may perform data compression with high compression ratios comparable to traditional L9 compressors with low latency and high single-stream performance In particular, the computing device 1200 may be capable of performing single-stream compression with performance suitable for high-bandwidth network connections (e.g., 25 Gb/sec networks). Additionally, the computing device 1200 may perform high-performance compression using a smaller buffer and/or with lower latency than compression approaches that use large-grained parallelism. For example, large-grained parallelism may require breaking up large files into multiple sections that are processed independently and thus may require relatively large data buffers and/or large latencies that are unsuitable for high single-stream performance In contrast, because the computing device 1200 operates with on fine-grained chunks (e.g., on the order of 128 bytes), the computing device 1200 may provide high single-stream performance for very small data buffers.

The processor 1220 may be embodied as any type of processor capable of performing the functions described herein. For example, the processor 1220 may be embodied as a single or multi-core processor(s), digital signal processor, microcontroller, or other processor or processing/controlling circuit. Similarly, the memory 1224 may be embodied as any type of volatile or non-volatile memory or data storage capable of performing the functions described herein. In operation, the memory 1224 may store various data and software used during operation of the computing device 1200 such operating systems, applications, programs, libraries, and drivers. The memory 1224 is communicatively coupled to the processor 1220 via the I/O subsystem 1222, which may be embodied as circuitry and/or components to facilitate input/output operations with the processor 1220, the memory 1224, and other components of the computing device 1200. For example, the I/O subsystem 1222 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1222 may form a portion of a system-on-a-chip (SoC) and be incorporated, along with the processor 1220, the memory 1224, and other components of the computing device 1200, on a single integrated circuit chip.

The data storage device 1226 may be embodied as any type of device or devices configured for short-term or long-term storage of data such as, for example, memory devices and circuits, memory cards, hard disk drives, solid-state drives, non-volatile flash memory, or other data storage devices. The computing device 1200 may also include a communications subsystem 1228, which may be embodied as any communication circuit, device, or collection thereof, capable of enabling communications between the computing device 1200 and other remote devices over a computer network (not shown). The communications subsystem 1228 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

The computing device 1200 may further include one or more peripheral devices 1230. The peripheral devices 1230 may include any number of additional input/output devices, interface devices, hardware accelerators, and/or other peripheral devices. For example, in some embodiments, the peripheral devices 1230 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 13:
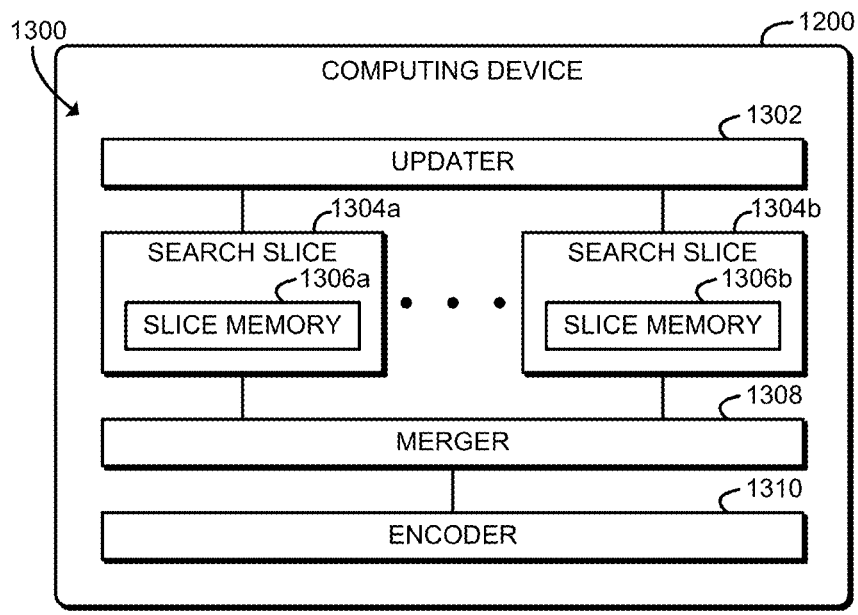
FIG. 13 is a simplified block diagram of at least one embodiment of an environment of the computing device of FIG. 12.

Referring now to FIG. 13, in an illustrative embodiment, the computing device 1200 establishes an environment 1300 during operation. The illustrative environment 1300 includes an updater 1302, multiple search slices 1304, a merger 1308, and an encoder 1310. The various components of the environment 1300 may be embodied as hardware, firmware, software, or a combination thereof. As such, in some embodiments, one or more of the components of the environment 1300 may be embodied as circuitry or collection of electrical devices (e.g., updater circuitry 1302, search slice circuitry 1304, merger circuitry 1308, and/or encoder circuitry 1310). It should be appreciated that, in such embodiments, one or more of the updater circuitry 1302, the search slice circuitry 1304, the merger circuitry 1308, and/or the encoder circuitry 1310 may form a portion of the processor 1220, the I/O subsystem 1222, the communications subsystem 1228, and/or other components of the computing device 1200. Additionally, in some embodiments, one or more of the illustrative components may form a portion of another component and/or one or more of the illustrative components may be independent of one another.

The updater 1302 is configured to update an index data structure based on an input data stream. The index data structure includes index data associated with offsets in the input data stream. The input data stream is divided into multiple chunks. Each chunk has a predetermined length and may overlap the previous chunk by a predetermined amount of data.

Each of the search slices 1304 is configured to process a disjoint subset of the chunks of the input data stream to generate a corresponding token stream, using the index data. For example, the chunks may be striped to the search slices 1304 by assigning each consecutive chunk to different search slice 1304. Thus, although the chunks may include overlapping data, each chunk is only processed by one search slice 1304. Each search slice 1304 may process a chunk using index data stored in a corresponding slice memory 1306. The updater 1302 may be further configured to provide the index data from the index data structure to the slice memories 1306. The index data may include, for example, hash table entries for input data corresponding to the chunks assigned to that search slice 1304. By including multiple search slices 1304, the computing device 1200 may process multiple chunks concurrently or otherwise in parallel. Additionally, although illustrated as including two search slices 1304*a*, 1304*b* it should be understood that in some embodiments the computing device 1200 may include additional search slices 1304*a*, 1304*b* (e.g., 16 slices 1304).

The merger 1308 is configured to merge the token streams generated by the search slices 1304 to generate a single output token stream. Merging the token streams may include reading a pair of consecutive tokens from the token streams and determining whether the pair of tokens originate from the same token stream (i.e., from the same search slice 1304). If so, the tokens may be output to the output token stream. If the tokens originate from different token streams (i.e., one of the tokens is the last token output by a search slice 1304 for a particular chunk and the other token is generated by a different search slice 1304 for the next chunk), the merger 1308 is configured to merge the tokens into one or more synchronized tokens that are output to the output token stream. To synchronize the tokens, the merger 1308 may select and apply one of multiple predetermined merge rules, as described below.

Figure 14:
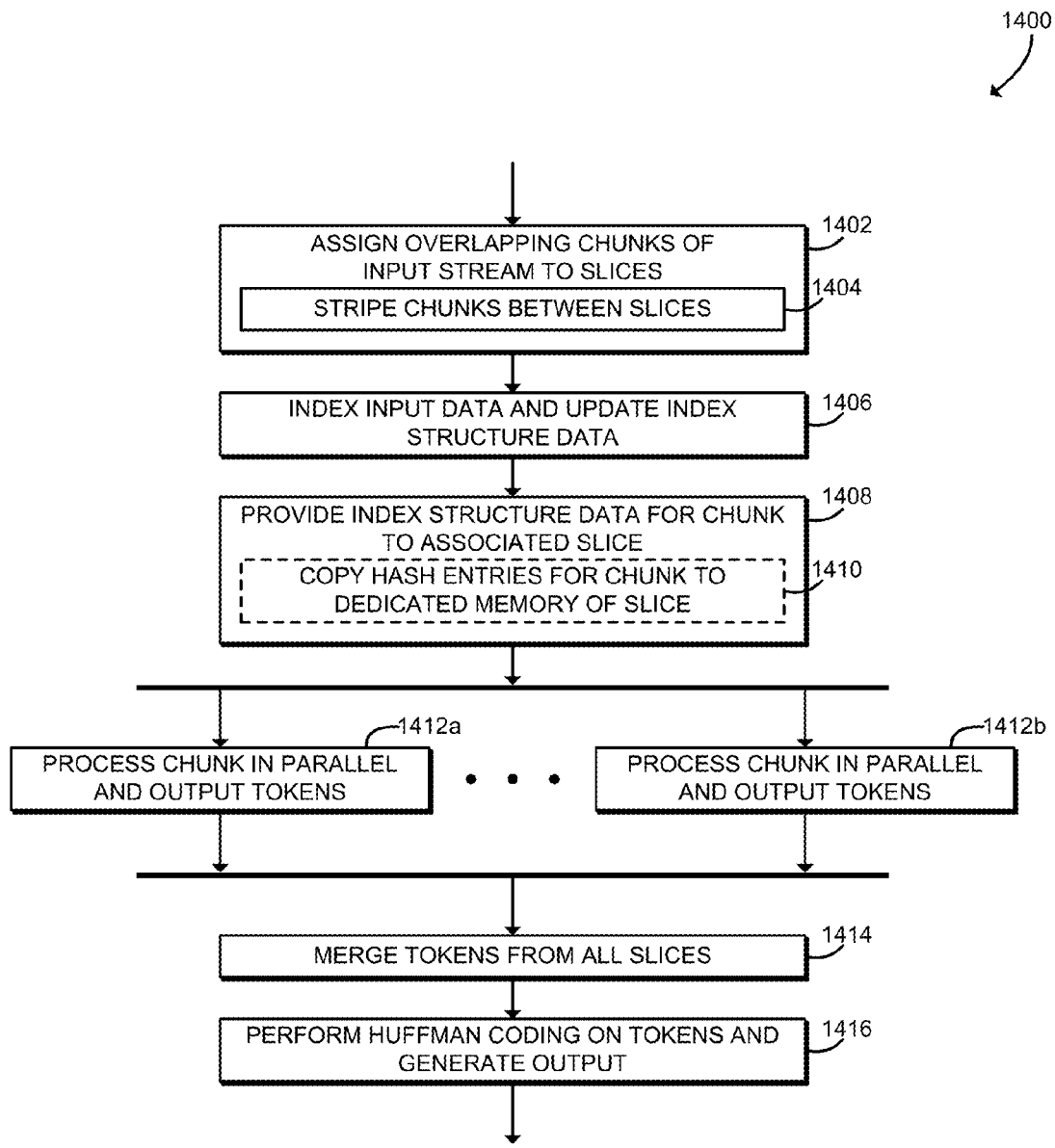
FIG. 14 is a simplified flow diagram of at least one embodiment of a method for high-performance single-stream data compression that may be executed by the computing device of FIGS. 12-13.

Referring now to FIG. 14, in use, the computing device 1200 may execute a method 1400 for high-performance single-stream data compression. It should be appreciated that, in some embodiments, the operations of the method 1400 may be performed by one or more components of the environment 1300 of the computing device 1200 as shown in FIG. 13. The method 1400 begins in block 1402, in which the computing device 1200 assigns overlapping chunks of an input data stream to the search slices 1304. The input data stream may be embodied as any stream of binary data that is to be compressed, such as an input file, a network stream, or other input data. Each of the chunks may be embodied as a fine-grained section of the input stream that may overlap the previous chunk by a small amount. For example, each chunk (after an initial chunk) may be 136 bytes long and overlap the previous chunk by 8 bytes. Overlaps of different sizes may be used in other embodiments. In general, larger overlaps may improve the compression ratio achieved by the computing device 1200 but may also increase performance overhead. For example, in some embodiments zero overlap between the chunks may provide acceptable performance but reduced compression ratio compared to typical L9 compression algorithms and an overlap of eight bytes may provide acceptable performance with compression ratios comparable to L9 compression algorithms. In some embodiments, overlaps larger than 12 bytes may provide diminishing returns for compression ratio compared to L9 compression algorithms. In block 1404, the computing device 1200 stripes the chunks between the search slices 1304. The computing device 1200 may, for example, assign each consecutive chunk to a different slice 1304. After striping, each slice 1304 is thus assigned to a disjoint subset of the chunks.

Figure 15:
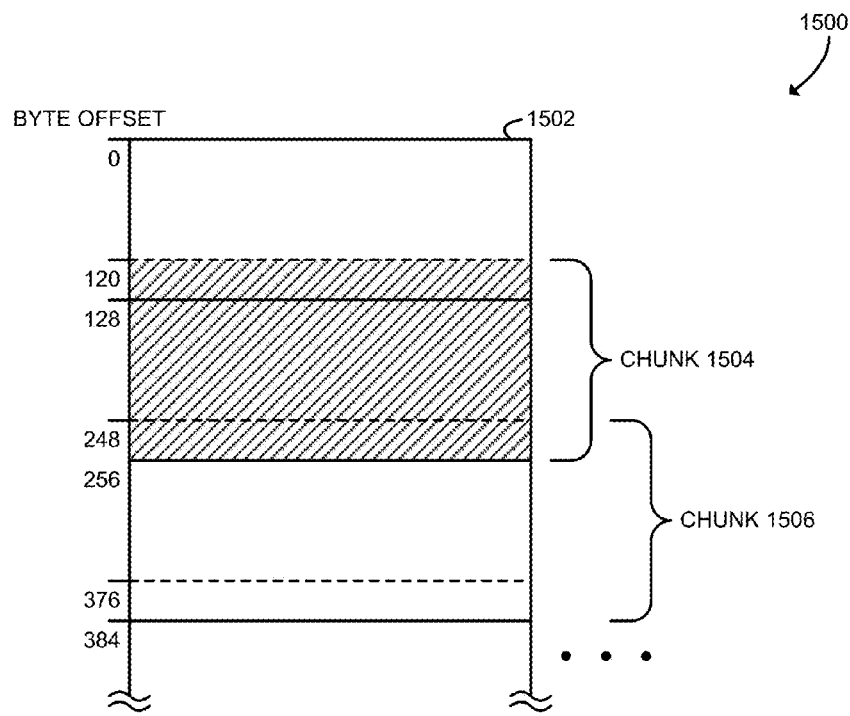
FIG. 15 is a schematic diagram illustrating an input data block organization that may be established by the computing device of FIGS. 12-13.

Referring now to FIG. 15, diagram 1500 illustrates division of an input data stream 1502 into chunks. In the illustrative embodiment, each chunk (after the initial chunk) is 136 bytes long and overlaps the previous chunk by 8 bytes. As shown, illustrative chunk 1504 ranges from byte 120 to byte 255 and illustrative chunk 1506 ranges from byte 248 to byte 383. The chunk 1506 overlaps the chunk 1504 at bytes 248 to 255. Because the initial chunk has no previous chunk to overlap, the initial chunk is 128 bytes long and ranges from byte 0 (i.e., the start of the input data stream) to byte 127. The chunk 1504 overlaps the initial chunk at bytes 120 to 127.

Figure 16:
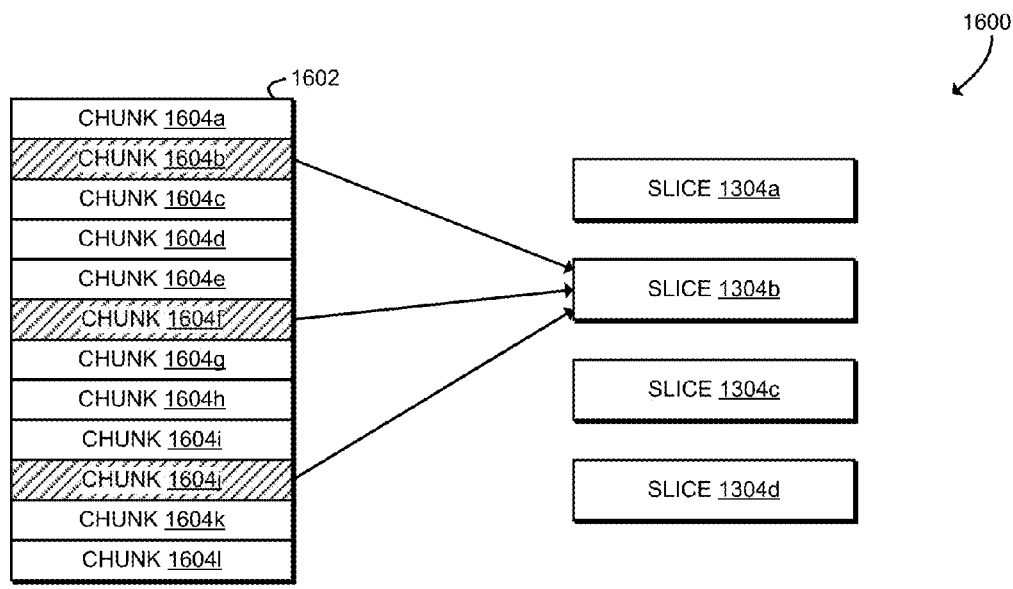
FIG. 16 is a schematic diagram illustrating a chunk assignment that may be established by the computing device of FIGS. 12-13.

Referring now to FIG. 16, diagram 1600 illustrates chunks that are striped between the search slices 1304. An input data stream 1602 is shown as being divided into chunks 1604. The illustrative embodiment includes four search slices 1304a through 204d. Each consecutive chunk 1604 is assigned to a different search slice 1304; that is, chunk 1604a is assigned to slice 1304a, chunk 1604b is assigned to slice 1304b, and so on. After assigning a chunk 1604 to the last slice 1304d, the computing device 1200 wraps back to slice 1304a and repeats assigning chunks 1604 in the same order. Thus, in the illustrative embodiment, each slice 1304 is assigned chunks 1604 that are separated by three other, non-assigned chunks 1604. For example, the slice 1304b is illustratively assigned the chunks 1604b, 1604f, 1604j.

Referring back to FIG. 14, after assigning the overlapping chunks, in block 1406 the computing device 1200 indexes the input data stream and updates one or more index data structures. As described further below, the index data structures may be used by the search slices 1304 to identify matching substrings within a search history window of the input data stream. The search window may be, for example, 32 kB of the input data stream. The index data structures may be embodied as, for example, a hash table that indexes three-byte sequences of the input data stream and a spill table to store index data in the event of hash collisions. The computing device 1200 may update the index data structures for every position (e.g., every byte offset) of the input data stream. To provide high single-stream performance, in some embodiments the computing device 1200 may perform updates for multiple positions in each clock cycle (e.g., process three bytes of the input data stream in every clock cycle of the processor 1220, I/O subsystem 1222, communications subsystem 1228, or other component of the computing device 1200).

In block 1408, the computing device 1200 provides index data for each chunk to the associated search slice 1304. In particular, the computing device 1200 may provide the index data associated with each position (e.g., byte offset) within a chunk to the associated search slice 1304. In some embodiments, in block 1410 the computing device 1200 may copy one or more hash table entries corresponding to the chunk to the slice memory 1306 of the corresponding search slice 1304. Because the chunks overlap, the computing device 1200 may copy the same hash table entry to more than one slice memory 1306.

After providing the index data to the search slices 1304, the method 1400 proceeds in parallel to multiple instances of block 1412. Each instance of the block 1412 may be executed by a search slice 1304. In block 1412, the computing device 1200 processes each chunk of the input data stream and generates an output token stream. Thus, each instance of the block 1412 generates a separate token stream. Each token stream includes literal tokens and reference tokens (also called pointer tokens or match tokens). Each token (both literal and reference) corresponds to a particular offset or range of offsets within the input data stream. Each literal token identifies a byte or other symbol from the input data stream. Each reference token includes a backward offset and a length, which identifies a repeated segment of the input data stream. The computing device 1200 may search the input data stream for matching substrings and output a reference token for the best match found. For example, the computing device 1200 may use index data generated by the updater 1302 to identify potential matches in a history buffer and then compare the data at those potential matches to the current data of the input data stream. Based on the results of those matches, the computing device 1200 outputs a token stream including literal tokens and/or reference tokens. One potential embodiment of a method for processing the chunks and outputting a token stream is described below in connection with FIG. 17.

After processing the chunks in parallel, the method 1400 proceeds to block 1414, in which the computing device 1200 merges the token streams generated by the search slices 1304 into a single output token stream. In the common case, the computing device 1200 may simply output consecutive tokens generated by the same search slice 1304. At the boundaries between chunks, the computing device 1200 may merge tokens generated by two different search slices 1304. The computing device 1200 merges the tokens by synchronizing token boundaries (e.g., the ending offset for a particular token and the starting offset for the next token) between the two slices 1304. The computing device 1200 may merge the tokens by outputting tokens unchanged or by dropping tokens, truncating tokens, replacing reference tokens with literal tokens, or otherwise modifying the token streams output from the search slices 1304. One potential embodiment of a method and associated rules for merging tokens is described below in connection with FIGS. 18-20.

In block 1416, the computing device 1200 performs Huffman encoding on the output token stream and generates the compressed output data. The compressed output data may be embodied as, for example, an output data block or other compressed data compatible with the DEFLATE algorithm. After generating the output data, the method 1400 is completed. The computing device 100 may re-execute the method 1400 to compress additional input data.

Although illustrated in FIG. 14 as performing the operations of the method 1400 sequentially, it should be understood that in some embodiments the computing device 1200 may perform those operations concurrently, in parallel, or in any other order. For example, in some embodiments the index data structure may be updated by the updater 1302 while the chunks are being processed in parallel by the slices 1304. In that example, the updater 1302 may process the input data stream at a faster rate than an individual search slice 1304, so that when a search slice 1304 finishes processing a chunk and jumps to the next assigned chunk, the updater 1302 has finished updating the index data structure for the next chunk.

The approximate performance of the computing device 1200 may be modeled using Equation 1, below, where N is the number of slices 1304, C is the compare performance of each slice 1304 (in cycles/byte processed), and U is the update performance of the updater 1302 (in bytes/cycle). For example, if C is 5.3 cycles/byte and U is 3 bytes/cycle, then N is about 16. Continuing that example, for a chunk size of 136 bytes with an overlap of 8 bytes, each slice 1304 takes about 720 cycles to process a chunk. The updater 1302 requires about 683 cycles to process the input stream data for a set of 16 chunks (corresponding to all 16 slices 1304). Because the updater 1302 and the slices 1304 may run in parallel, the total time to process 16 chunks (corresponding to 2048 bytes of input data) is 720 cycles. Because the updater 1302 completes processing faster than the slices 1304, the slices 1304 do not have to wait on the updater 1302 when they are ready to process a new chunk.

$$N = C \times U \tag{1}$$

Figure 17:
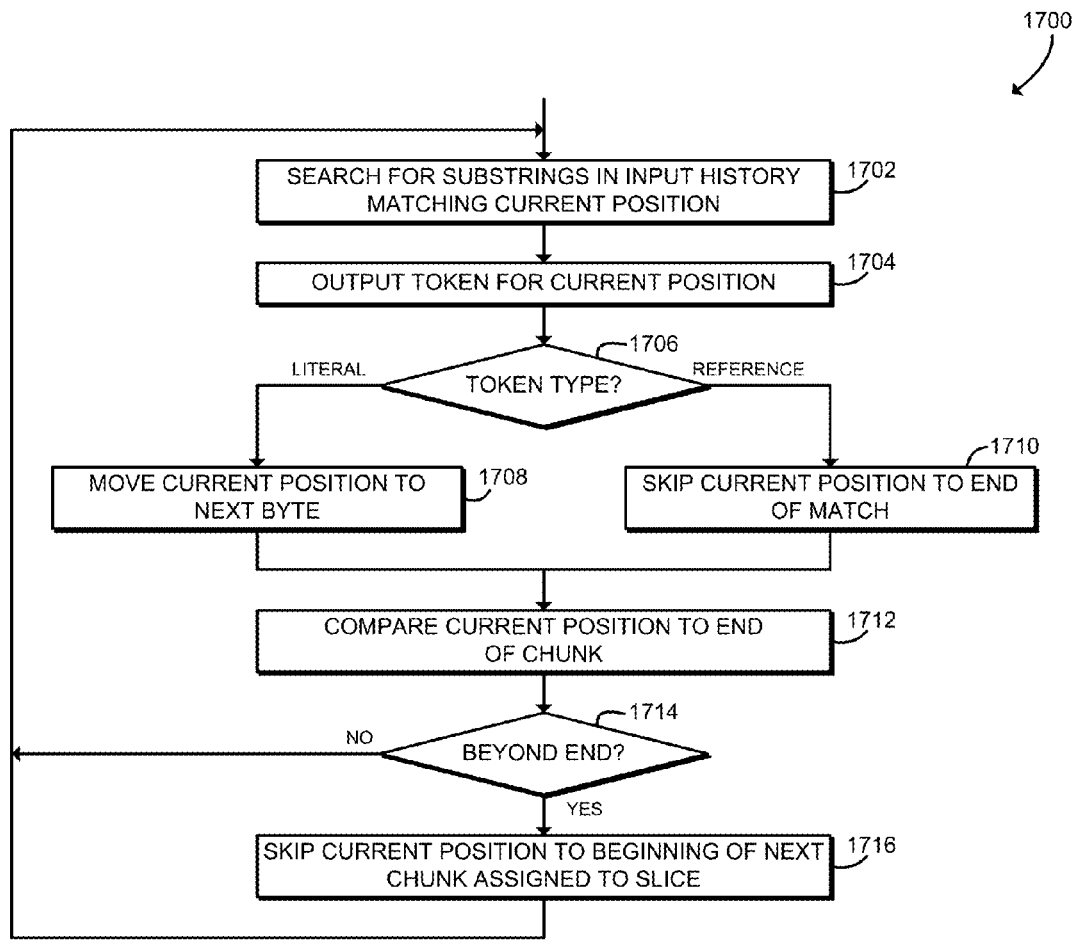
FIG. 17 is a simplified flow diagram of at least one embodiment of a method for searching for matching substrings that may be executed by the computing device of FIGS. 12-13.

Referring now to FIG. 17, in use, the computing device 1200 may execute a method 1700 for searching for matching substrings. It should be appreciated that, in some embodiments, the operations of the method 1700 may be performed by one or more components of the environment 1300 of the computing device 1200 as shown in FIG. 13. In particular, the method 1700 may be performed by a search slice 1304 as described above in connection with the block 1412 of FIG. 14.

The method 1700 begins in block 1702, in which the computing device 1200 searches for substrings in the input history that match the current position in the input data stream. The computing device 1200 may search for matches using a global history buffer or other history data structure that is maintained for the entire input data stream. For example, the history buffer may be embodied as a single buffer that is multi-ported and/or time-sliced, or in some embodiments multiple copies the history buffer may exist (e.g. one copy of the history buffer per search slice 1304), The computing device 1200 may use any appropriate technique to search the input history. For example, the computing device 1200 may use index data generated by the updater 1302 (e.g., one or more hash table entries) to identify potential matches in the history buffer and then compare the data at those potential matches to the current data of the input data stream. The index data may be stored in a global data structure such as one or more hash tables and/or spill tables, or in some embodiments, a particular search slice 1304 may access index data (e.g., hash table entries) from a particular dedicated slice memory 1306. The computing device 1200 may evaluate multiple potential matches in the history buffer to identify the best match to the current data (e.g., the longest match, the shortest distance in the history buffer, or other metric), Each match starts in the current chunk but may extend beyond the end of the current chunk to either the maximum compare length or the end of the input data stream.

In block 1704, the computing device 1200 outputs a token for the current position. As described above, the token may be a literal token that identifies a byte or other symbol from the input data stream or a reference token that identifies a matching substring in the input history. In block 1706, the computing device 1200 switches on the type of the output token. If the token is a literal token, the method 1700 branches to block 1708, in which the computing device 1200 moves the current position to the next position (e.g., the next byte) in the input data stream. Referring back to block 1706, if the token is a reference token the method 1700 branches to block 1710, in which the computing device 1200 skips the current position to the end of the match.

After moving the current position, in block 1712 the computing device 1200 compares the current position to the end of the current chunk. In block 1714 the computing device 1200 determines whether the current position is beyond the end of the current chunk. For example, the current position may extend beyond the end of the current chunk after outputting a reference token and skipping to the end of the match. If the current position is not beyond the end of the current chunk, the method 1700 loops back to block 1702 to continue searching for substring matches. If the current position is beyond the end of the current chunk, the method 1700 advances to block 1716, in which the computing device 1200 skips the current position to the beginning of the next chunk assigned to the slice. The beginning of the next chunk may be determined as a function of the length of each chunk and the number of search slices 1304. For example, the start position may be determined by adding the product of the length of each chunk (minus the overlap with the previous chunk) and the number of search slices 1304 to the start position of the current chunk. For an illustrative computing device 1200 having sixteen search slices 1304 that process 136-byte chunks with 8-byte overlap, the next start of the next chunk may thus be 2048 bytes after the start of the current chunk. After skipping to the start of the next chunk, the method 1700 loops back to block 1702 to continue searching for matching substrings.

Figure 18:
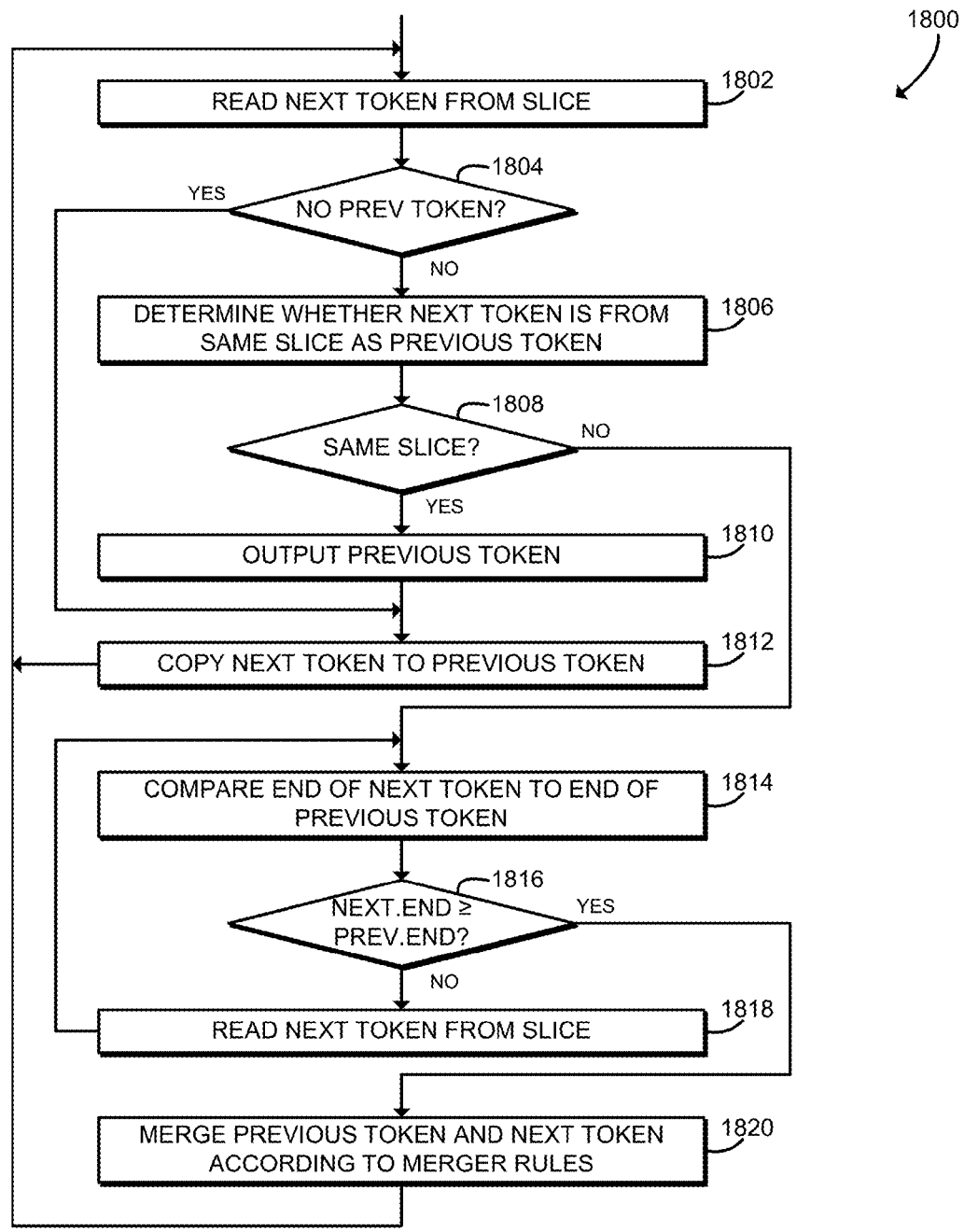
FIG. 18 is a simplified flow diagram of at least one embodiment of a method for merging output tokens that may be executed by the computing device of FIGS. 12-13.

Referring now to FIG. 18, in use, the computing device 1200 may execute a method 1800 for merging output tokens. It should be appreciated that, in some embodiments, the operations of the method 1800 may be performed by one or more components of the environment 1300 of the computing device 1200 as shown in FIG. 13. In particular, the method 1800 may be performed by the merger 1308 as described above in connection with the block 1414 of FIG. 14. The method 1800 begins in block 1802, in which the computing device 1200 reads the next token output from a search slice 1304. As described further below, the computing device 1200 operates in a pipelined fashion on two tokens at a time, which are labeled as the previous token and the next token. The tokens may be stored, for example, in a two-element array or other buffer. The tokens are read in order from each slice 1304. When the last token associated with a particular chunk of the input data stream has been read from a slice 1304, the computing device 1200 reads the next chunk from the next slice 1304. For example, referring to the illustration of FIG. 16, after reading the last token associated with the chunk 1604*a* (generated by the slice 1304*a*), the computing device 1200 reads the next token, associated with the chunk 1604*b*, from the slice 1304*b*.

In block 1804, the computing device 1200 determines whether the previous token exists in the processing pipeline. The previous token may not exist, for example, when starting the compression process or when the pipeline has been cleared. If no previous token exists, the method 1800 skips ahead to block 1812, described below. If a previous token exists, the method 1800 advances to block 1806.

In block 1806, the computing device 1200 determines whether the next token was generated by the same slice 1304 as the previous token. As described above, in the common case the tokens are generated by the same slice 1304. In block 1808, the computing device 1200 checks whether the next token and the previous token were generated by the same slice 1304. If not, the method 1800 skips ahead to block 1814, described below. If the previous token and the next token were generated by the same slice 1304, the method 1800 advances to block 1810.

In block 1810, the computing device 1200 outputs the previous token to the output token stream. As described above, after being output, tokens may be encoded for output in the compressed output data. In block 1812, the computing device 1200 copies the next token to the previous token. After copying the next token, the method 1800 loops back to block 1802 to continue reading the token streams from the search slices 1304.

Referring back to block 1808, if the next token and the previous token were not generated by the same slice 1304, the method 1800 branches to block 1814. In block 1814, the computing device 1200 compares the end position of the next token to the end position of the previous token. As described above, each token corresponds to a range of offsets within the input data stream. In block 1816, the computing device 1200 determines whether the end position of the next token is greater than (i.e., occurs after) or equal to the end position of the previous token. If not, the method 1800 advances to block 1818, in which the computing device 1200 reads the next token from the current slice 1304 (discarding the previous value of the next token). After reading the next token, the method 1800 loops back to block 1814 to compare the end positions of the new next token and the previous token. Thus, the computing device 1200 skips tokens from the current slice 1304 until reaching a next token with an end position greater than or equal to the end position of the previous token.

Figure 19:
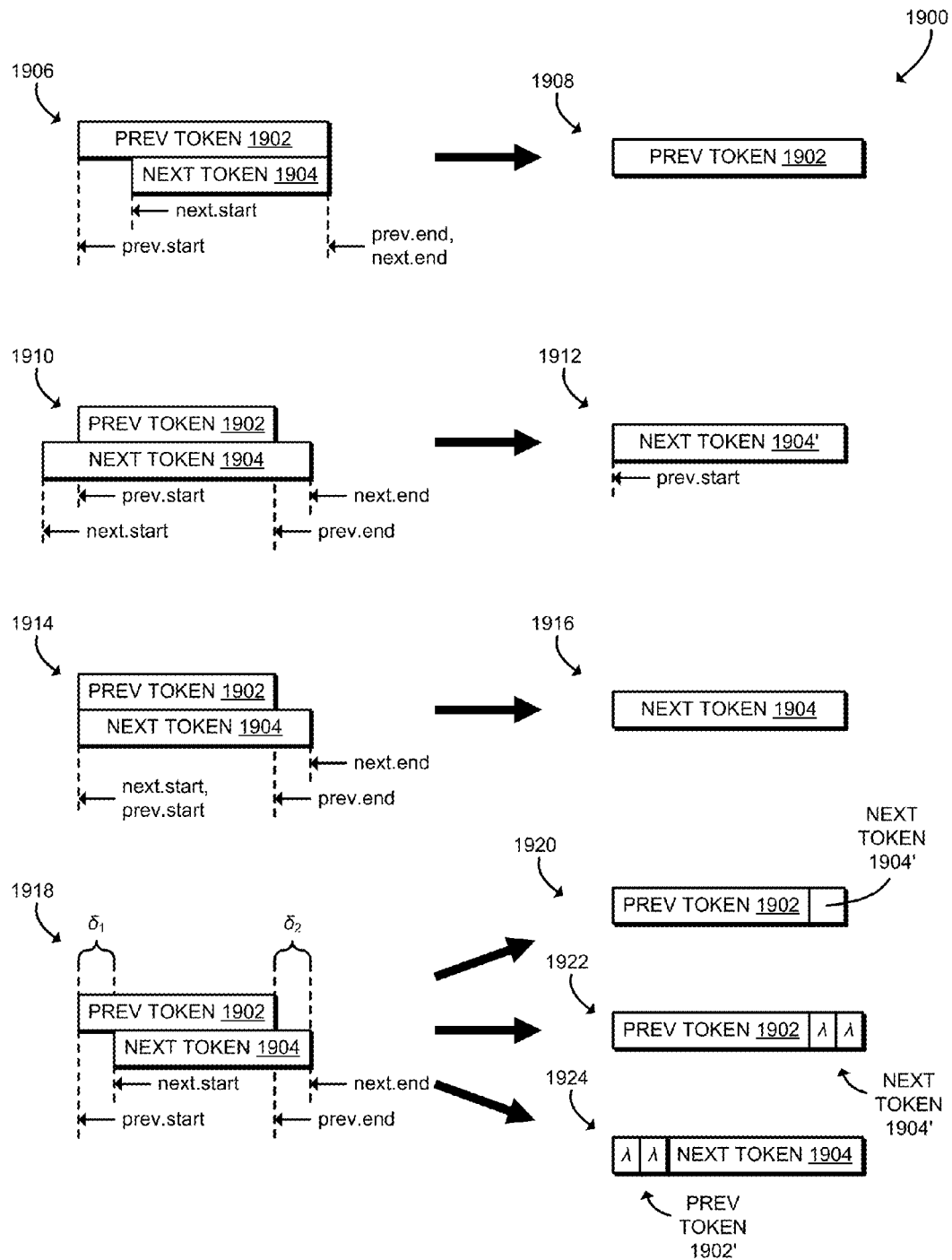
FIG. 19 is a schematic diagram illustrating token merger rules that may be performed by the method of FIG. 18.

Referring back to block 1816, if the end position of the next token is greater than or equal to the end position of the previous token, the method 1800 branches to block 1820. In block 1820, the computing device 1200 merges the previous token and the next token according to a set of predetermined merger rules. Each merger rule defines one or more actions to perform based on the input conditions of the next token and the previous token. In particular, the merger rule may be selected by comparing the start positions and end positions of the next token and the previous token. Actions performed by the computing device 1200 to merge the tokens may include outputting tokens, dropping tokens, truncating tokens and/or converting reference tokens to literal tokens. FIGS. 19 and 20, described below, illustrate one potential embodiment of the merger rules and the corresponding input conditions of the tokens. After merging the previous token and the next token, the method 1800 loops back to block 1802 to continue merging tokens.

Referring now to FIG. 19, schematic diagram 1900 illustrates the results of applying the merger rules to tokens in various input conditions. As described above in connection with block 1820 of FIG. 18, the computing device 1200 may match the input conditions of a previous token 1902 and a next token 1904 against multiple predetermined conditions. The diagram 1900 illustrates the relative positions of the previous token 1902 and the next token 1904 for each of those input conditions. After selecting a matching condition, the computing device 1200 performs one or more actions to generate a corresponding result. Each result of the diagram 1900 illustrates the tokens that are output to the output token stream.

As shown in FIG. 19, a condition 1906 occurs when the end position of the previous token 1902 equals the end position of the next token 1904. Result 1908 is generated for the condition 1906. As shown, the result 1908 drops the next token 1904 and outputs the previous token 1902 unchanged. Condition 1910 occurs when the start position of the next token 1904 is less than (i.e., earlier than) the start position of the previous token 1902. Result 1912 is generated for the condition 1910. The result 1912 drops the previous token 1902 and truncates the next token 1904 to generate a truncated next token 1904' that starts at the start position of the previous token 1902. Condition 1914 occurs when the start position of the previous token 1902 and the start position of the next token 1904 are equal. Result 1916 is generated for the condition 1914. The result 1916 drops the previous token 1902 and outputs the next token 1904 unchanged.

Condition 1918 occurs when the start position of the next token 1904 is greater than (i.e., later than) the start position of the previous token 1902. As shown, one of potential results 1920, 1922, 1924 may be generated for the condition 1918. The results 1920, 1922, 1924 may be selected by comparing the distance $\delta_1$ between the start position of the previous token 1902 and the start position of the next token 1904 and the distance $\delta_2$ between the end position of the previous token 1902 and the end position of the next token 1904 to a predetermined threshold distance. As shown, the result 1920 outputs the previous token 1902 unchanged and truncates the next token 1904 to a truncated next token 1904' that starts at the end position of the previous token 1902. The result 1922 outputs the previous token 1902 unchanged and truncates the next token 1904 to a truncated next token 1904' that starts at the end position of the previous token 1902 and includes only literal tokens A. The result 1924 truncates the previous token 1902 to a truncated previous token 1902' that ends at the start position of the next token 1904 and that includes only literal tokens $\lambda$. The result 1924 also outputs the next token 1904 unchanged.

Referring now to FIG. 20, diagram 2000 illustrates the various merger rules that may be applied by the computing device 1200. Table 2002 illustrates four merger rules 2004, which may be evaluated by the computing device 1200 in sequential order. Each merger rule 2004 defines a condition 2006 that is evaluated by the computing device 1200. Each merger rule 2004 also defines a previous token action 2008 and a next token action 2010. If the condition 2006 for a rule 2004 evaluates to true, then the computing device 1200 performs the associated previous token action 2008 and next token action 2010. If the condition 2006 for a merger rule 2004 evaluates to false, the computing device 1200 evaluates the next merger rule 2004.

As shown in the table 2002, merger rule 1 applies if the end position of the next token equals the end position of the previous token. If merger rule 1 applies then the previous token is output unchanged and the next token is dropped. Merger rule 1 corresponds to the condition 1906 and the result 1908 of FIG. 19. Merger rule 2 applies if the start position of the next token is less than the start position of the previous token. If merger rule 2 applies, then the previous token is dropped and the next token is truncated to start at the start position of the previous token. Merger rule 2 corresponds to the condition 1910 and the result 1912 of FIG. 19. Merger rule 3 applies if the start position of the next token equals the start position of the previous token. If merger rule 3 applies, then the previous token is dropped and the next token is output unchanged. Merger rule 3 corresponds to the condition 1914 and the result 1916 of FIG. 19. Merger rule 4 applies if the start position of the next token is greater than the start position of the previous token. If merger rule 4 applies, one or more sub-rules are evaluated to determine the previous token action 2008 and the next token action 2010. Merger rule 4 corresponds to the condition 1918 and the results 1920, 1922, 1924 of FIG. 19.

Table 2012 illustrates sub-rules 2014 of the merger rule 4. Similar to the merger rules 2004 of the table 2002, each sub-rule 2014 defines a sub-condition 2016 as well as a previous token action 2008 and a next token action 2010. As shown in table 2012, sub-rule 4.*a* applies if the distance $\delta_1$ between the start position of the previous token and the start position of the next token is greater than a predetermined threshold distance T and the distance $\delta_2$ between the end position of the previous token and the end position of the next token is greater than the distance T. The predetermined threshold distance T may be embodied as a small number of bytes, such as 3 or 4 bytes. If sub-rule 4.*a* applies, then the previous token is output unchanged and the next token is truncated to a reference token that starts at the end position of the previous token. The sub-rule 4.*a* corresponds to the result 1920 of FIG. 19. Sub-rule 4.*b* applies if only the distance $\delta_1$ is greater than the threshold distance T. If sub-rule 4.*b* applies, then the previous token is output unchanged and the next token is truncated to one or more literal tokens starting at the end position of the previous token. The sub-rule 4.*b* corresponds to the result 1922 of FIG. 19. Sub-rule 4.*c* applies if only the distance $\delta_2$ is greater than the threshold distance T. If sub-rule 4.*c* applies, then the previous token is truncated to one or more literal tokens ending at the start position of the next token and the next token is output unchanged. The sub-rule 4.*c* corresponds to the result 1924 of FIG. 19.

Sub-rule 4.*d* applies if neither the distance $\delta_1$ nor the distance $\delta_2$ is greater than the threshold distance T. If sub-rule 4.*d* applies, then the actions for either the sub-rule 4.*b* or 4.*c* may be applied. The computing device 1200 may select between sub-rules 4.*b* and 4.*c* based on a scoring function. For example, the computing device 1200 may select the sub-rule 4.*b* or 4.*c* that produces the fewest number of literal tokens. As another example, the computing device 1200 may select the sub-rule 4.*b* or 4.*c* that produces tokens with the shortest match distance.

It should be appreciated that, in some embodiments, the methods 1400, 1700, and/or 700 may be embodied as various instructions stored on a computer-readable media, which may be executed by the processor 1220, the I/O subsystem 1222, the communications subsystem 1228 and/or other components of the computing device 1200 to cause the computing device 1200 to perform the method 1400. The computer-readable media may be embodied as any type of media capable of being read by the computing device 1200 including, but not limited to, the memory 1224, the data storage device 1226, firmware devices, other memory or data storage devices of the computing device 1200, portable media readable by a peripheral device 1230 of the computing device 1200, and/or other media.

EXAMPLES

Illustrative examples of the technologies disclosed herein are provided below. An embodiment of the technologies may include any one or more, and any combination of, the examples described below.

Example 1 includes a computing device for data compression, the computing device comprising: updater circuitry to update an index data structure based on an input data stream, wherein the index data structure includes index data associated with offsets in the input data stream, and wherein the input data stream is divided into a plurality of chunks, wherein each chunk has a first length; a plurality of search slice circuitry, wherein respective search slice circuitry is to process a disjoint subset of the plurality of chunks of the input data stream to generate a corresponding token stream, wherein respective search slice circuitry uses the index data to process the disjoint subset of the plurality of chunks; and merger circuitry to merge the plurality of token streams to generate an output token stream.

Example 2 includes the subject matter of Example 1, and wherein the first length comprises 128 bytes.

Example 3 includes the subject matter of any of Examples 1 and 2, and wherein each chunk overlaps a previous chunk by a second length.

Example 4 includes the subject matter of any of Examples 1-3, and wherein the first length comprises 136 bytes and the second length comprises eight bytes.

Example 5 includes the subject matter of any of Examples 1-4, and wherein: the updater circuitry is further to provide index data from the index data structure to a plurality of slice memories, wherein each slice memory corresponds to respective search slice circuitry; and to process the disjoint subset of the plurality of chunks with the index data to generate the corresponding token stream comprises the respective search slice circuitry to access the corresponding slice memory that includes index data associated with the disjoint subset of the plurality of chunks.

Example 6 includes the subject matter of any of Examples 1-5, and further comprising encoder circuitry to encode the output token stream to generate a compressed output block.

Example 7 includes the subject matter of any of Examples 1-6, and wherein the plurality of chunks are striped into the plurality of disjoint subsets.

Example 8 includes the subject matter of any of Examples 1-7, and wherein each chunk of a disjoint subset is separated from a previous chunk by the first length times one less than a number of token streams.

Example 9 includes the subject matter of any of Examples 1-8, and wherein to merge the plurality of token streams to generate the output token stream comprises the merger circuitry to: read a previous token and a next token from the plurality of token streams, wherein the previous token and the next token are consecutive with respect to the input data stream; determine whether the previous token and the next token originate from the same token stream; output the previous token to the output token stream in response to a determination that the previous token and the next token originate from the same token stream; copy the next token to the previous token in response to outputting of the previous token; read the next token from the plurality of token streams in response to copying of the next token; and merge the previous token and the next token to generate one or more synchronized tokens in response to a determination that the previous token and the next token do not originate from the same token stream.

Example 10 includes the subject matter of any of Examples 1-9, and wherein to merge the previous token and the next token comprises the merger circuitry to: determine whether an end offset of the next token is greater than or equal to an end offset of the previous token; read a next token from the plurality of token streams in response to a determination that the end offset of the next token is not greater than or equal to the end offset of the previous token; and merge the previous token and the next token in response to a determination that the end offset of the next token is greater than or equal to the end offset of the previous token.

Example 11 includes the subject matter of any of Examples 1-10, and wherein to merge the previous token and the next token further comprises the merger circuitry to:

determine whether the end offset of the next token equals the end offset of the previous token; and drop the next token in response to a determination that the end offset of the next token equals the end offset of the previous token.

Example 12 includes the subject matter of any of Examples 1-11, and wherein to merge the previous token and the next token further comprises the merger circuitry to: determine whether a start offset of the next token is less than a start offset of the previous token; drop the previous token in response to a determination that the start offset of the next token is less than the start offset of the previous token; and truncate the next token to start at the start offset of the previous token in response to the determination that the start offset of the next token is less than the start offset of the previous token.

Example 13 includes the subject matter of any of Examples 1-12, and wherein to merge the previous token and the next token further comprises the merger circuitry to: determine whether a start offset of the next token equals a start offset of the previous token; and drop the previous token in response to a determination that the start offset of the next token equals the start offset of the previous token.

Example 14 includes the subject matter of any of Examples 1-13, and wherein to merge the previous token and the next token further comprises the merger circuitry to: determine whether a start offset of the next token is greater than a start offset of the previous token; determine whether a first difference between the start offset of the next token and the start offset of the previous token is greater than a predetermined threshold offset in response to a determination that the start offset of the next token is greater than the start offset of the previous token; determine whether a second difference between the end offset of the next token and the end offset of the previous token is greater than the predetermined threshold offset in response to the determination that the start offset of the next token is greater than the start offset of the previous token; and truncate the next token to a reference token that starts at the end offset of the previous token in response to a determination that the first difference is greater than the predetermined threshold offset and the second difference is greater than the predetermined threshold offset.

Example 15 includes the subject matter of any of Examples 1-14, and wherein to merge the previous token and the next token further comprises the merger circuitry to truncate the next token to one or more literal tokens that start at the end offset of the previous token in response to a determination that the first offset is greater than the predetermined threshold offset and the second difference is not greater than the predetermined threshold offset.

Example 16 includes the subject matter of any of Examples 1-15, and wherein to merge the previous token and the next token further comprises the merger circuitry to truncate the previous token to one or more literal tokens that end at the start offset of the next token in response to a determination that the first offset is not greater than the predetermined threshold offset and the second difference is greater than the predetermined threshold offset.

Example 17 includes the subject matter of any of Examples 1-16, and wherein to merge the previous token and the next token further comprises the merger circuitry to select between truncation of the previous token to one or more literal tokens or truncation of the next token to one or more literal tokens based on a scoring function in response to a determination that the first offset is not greater than the predetermined threshold offset and the second difference is not greater than the predetermined threshold offset.

Example 18 includes the subject matter of any of Examples 1-17, and wherein to select based on the scoring function comprises the merger circuitry to select a fewest number of literal tokens.

Example 19 includes a method for data compression, the method comprising: updating, by a computing device, an index data structure based on an input data stream, wherein the index data structure includes index data associated with offsets in the input data stream; processing, by the computing device, a plurality of chunks of the input data stream in parallel to generate a plurality of token streams using the index data, wherein each chunk has a first length and each chunk overlaps a previous chunk by a second length, and wherein each token stream is generated from a corresponding disjoint subset of the plurality of chunks; and merging, by the computing device, the plurality of token streams to generate an output token stream.

Example 20 includes the subject matter of Example 19, and wherein the first length comprises 128 bytes.

Example 21 includes the subject matter of any of Examples 19 and 20, and wherein each chunk overlaps a previous chunk by a second length.

Example 22 includes the subject matter of any of Examples 19-21, and wherein the first length comprises 136 bytes and the second length comprises eight bytes.

Example 23 includes the subject matter of any of Examples 19-22, and further comprising: providing, by the computing device, index data from the index data structure to a plurality of slice memories; wherein processing the plurality of chunks in parallel using the index data to generate the plurality of token streams comprises accessing, for each of the token streams, a slice memory that includes index data associated with the disjoint subset of the plurality of chunks associated with the corresponding token stream.

Example 24 includes the subject matter of any of Examples 19-23, and further comprising encoding, by the computing device, the output token stream to generate a compressed output block.

Example 25 includes the subject matter of any of Examples 19-24, and wherein the plurality of chunks are striped into the plurality of disjoint subsets.

Example 26 includes the subject matter of any of Examples 19-25, and wherein each chunk of a disjoint subset is separated from a previous chunk by the first length times one less than a number of token streams.

Example 27 includes the subject matter of any of Examples 19-26, and wherein merging the plurality of token streams to generate the output token stream comprises: reading a previous token and a next token from the plurality of token streams, wherein the previous token and the next token are consecutive with respect to the input data stream; determining whether the previous token and the next token originate from the same token stream; outputting the previous token to the output token stream in response to determining that the previous token and the next token originate from the same token stream; copying the next token to the previous token in response to outputting the previous token; reading the next token from the plurality of token streams in response to copying the next token; and merging the previous token and the next token to generate one or more synchronized tokens in response to determining that the previous token and the next token do not originate from the same token stream.

Example 28 includes the subject matter of any of Examples 19-27, and wherein merging the previous token and the next token further comprises: determining whether an end offset of the next token is greater than or equal to an end offset of the previous token; reading a next token from the plurality of token streams in response to determining that the end offset of the next token is not greater than or equal to the end offset of the previous token; and merging the previous token and the next token in response to determining that the end offset of the next token is greater than or equal to the end offset of the previous token.

Example 29 includes the subject matter of any of Examples 19-28, and wherein merging the previous token and the next token further comprises: determining whether the end offset of the next token equals the end offset of the previous token; and dropping the next token in response to determining that the end offset of the next token equals the end offset of the previous token.

Example 30 includes the subject matter of any of Examples 19-29, and wherein merging the previous token and the next token further comprises: determining whether a start offset of the next token is less than a start offset of the previous token; dropping the previous token in response to determining that the start offset of the next token is less than the start offset of the previous token; and truncating the next token to start at the start offset of the previous token in response to determining that the start offset of the next token is less than the start offset of the previous token.

Example 31 includes the subject matter of any of Examples 19-30, and wherein merging the previous token and the next token further comprises: determining whether a start offset of the next token equals a start offset of the previous token; and dropping the previous token in response to determining that the start offset of the next token equals the start offset of the previous token.

Example 32 includes the subject matter of any of Examples 19-31, and wherein merging the previous token and the next token further comprises: determining whether a start offset of the next token is greater than a start offset of the previous token; determining whether a first difference between the start offset of the next token and the start offset of the previous token is greater than a predetermined threshold offset in response to determining that the start offset of the next token is greater than the start offset of the previous token; determining whether a second difference between the end offset of the next token and the end offset of the previous token is greater than the predetermined threshold offset in response to determining that the start offset of the next token is greater than the start offset of the previous token; and truncating the next token to a reference token that starts at the end offset of the previous token in response to determining that the first difference is greater than the predetermined threshold offset and the second difference is greater than the predetermined threshold offset.

Example 33 includes the subject matter of any of Examples 19-32, and wherein merging the previous token and the next token further comprises truncating the next token to one or more literal tokens that start at the end offset of the previous token in response to determining that the first offset is greater than the predetermined threshold offset and the second difference is not greater than the predetermined threshold offset.

Example 34 includes the subject matter of any of Examples 19-33, and wherein merging the previous token and the next token further comprises truncating the previous token to one or more literal tokens that end at the start offset of the next token in response to determining that the first offset is not greater than the predetermined threshold offset and the second difference is greater than the predetermined threshold offset.

Example 35 includes the subject matter of any of Examples 19-34, and wherein merging the previous token and the next token further comprises selecting between truncating the previous token to one or more literal tokens or truncating the next token to one or more literal tokens based on a scoring function in response to determining that the first offset is not greater than the predetermined threshold offset and the second difference is not greater than the predetermined threshold offset.

Example 36 includes the subject matter of any of Examples 19-35, and wherein selecting based on the scoring function comprises selecting a fewest number of literal tokens.

Example 37 includes a computing device comprising: a processor; and a memory having stored therein a plurality of instructions that when executed by the processor cause the computing device to perform the method of any of Examples 19-36.

Example 38 includes one or more machine readable storage media comprising a plurality of instructions stored thereon that in response to being executed result in a computing device performing the method of any of Examples 19-36.

Example 39 includes a computing device comprising means for performing the method of any of Examples 19-36.

Example 40 includes a computing device for data compression, the computing device comprising: means for updating an index data structure based on an input data stream, wherein the index data structure includes index data associated with offsets in the input data stream; means for processing a plurality of chunks of the input data stream in parallel to generate a plurality of token streams using the index data, wherein each chunk has a first length and each chunk overlaps a previous chunk by a second length, and wherein each token stream is generated from a corresponding disjoint subset of the plurality of chunks; and means for merging the plurality of token streams to generate an output token stream.

Example 41 includes the subject matter of Example 40, and wherein the first length comprises 128 bytes.

Example 42 includes the subject matter of any of Examples 40 and 41, and wherein each chunk overlaps a previous chunk by a second length.

Example 43 includes the subject matter of any of Examples 40-42, and wherein the first length comprises 136 bytes and the second length comprises eight bytes.

Example 44 includes the subject matter of any of Examples 40-43, and further comprising: means for providing index data from the index data structure to a plurality of slice memories; wherein the means for processing the plurality of chunks in parallel using the index data to generate the plurality of token streams comprises means for accessing, for each of the token streams, a slice memory that includes index data associated with the disjoint subset of the plurality of chunks associated with the corresponding token stream.

Example 45 includes the subject matter of any of Examples 40-44, and further comprising means for encoding the output token stream to generate a compressed output block.

Example 46 includes the subject matter of any of Examples 40-45, and wherein the plurality of chunks are striped into the plurality of disjoint subsets.

Example 47 includes the subject matter of any of Examples 40-46, and wherein each chunk of a disjoint subset is separated from a previous chunk by the first length times one less than a number of token streams.

Example 48 includes the subject matter of any of Examples 40-47, and wherein the means for merging the plurality of token streams to generate the output token stream comprises: means for reading a previous token and a next token from the plurality of token streams, wherein the previous token and the next token are consecutive with respect to the input data stream; means for determining whether the previous token and the next token originate from the same token stream; means for outputting the previous token to the output token stream in response to determining that the previous token and the next token originate from the same token stream; means for copying the next token to the previous token in response to outputting the previous token; means for reading the next token from the plurality of token streams in response to copying the next token; and means for merging the previous token and the next token to generate one or more synchronized tokens in response to determining that the previous token and the next token do not originate from the same token stream.

Example 49 includes the subject matter of any of Examples 40-48, and wherein the means for merging the previous token and the next token further comprises: means for determining whether an end offset of the next token is greater than or equal to an end offset of the previous token; means for reading a next token from the plurality of token streams in response to determining that the end offset of the next token is not greater than or equal to the end offset of the previous token; and means for merging the previous token and the next token in response to determining that the end offset of the next token is greater than or equal to the end offset of the previous token.

Example 50 includes the subject matter of any of Examples 40-49, and wherein the means for merging the previous token and the next token further comprises: means for determining whether the end offset of the next token equals the end offset of the previous token; and means for dropping the next token in response to determining that the end offset of the next token equals the end offset of the previous token.

Example 51 includes the subject matter of any of Examples 40-50, and wherein the means for merging the previous token and the next token further comprises: means for determining whether a start offset of the next token is less than a start offset of the previous token; means for dropping the previous token in response to determining that the start offset of the next token is less than the start offset of the previous token; and means for truncating the next token to start at the start offset of the previous token in response to determining that the start offset of the next token is less than the start offset of the previous token.

Example 52 includes the subject matter of any of Examples 40-51, and wherein the means for merging the previous token and the next token further comprises: means for determining whether a start offset of the next token equals a start offset of the previous token; and means for dropping the previous token in response to determining that the start offset of the next token equals the start offset of the previous token.

Example 53 includes the subject matter of any of Examples 40-52, and wherein the means for merging the previous token and the next token further comprises: means for determining whether a start offset of the next token is greater than a start offset of the previous token; means for determining whether a first difference between the start offset of the next token and the start offset of the previous token is greater than a predetermined threshold offset in response to determining that the start offset of the next token is greater than the start offset of the previous token; means for determining whether a second difference between the end offset of the next token and the end offset of the previous token is greater than the predetermined threshold offset in response to determining that the start offset of the next token is greater than the start offset of the previous token; and means for truncating the next token to a reference token that starts at the end offset of the previous token in response to determining that the first difference is greater than the predetermined threshold offset and the second difference is greater than the predetermined threshold offset.

Example 54 includes the subject matter of any of Examples 40-53, and wherein the means for merging the previous token and the next token further comprises means for truncating the next token to one or more literal tokens that start at the end offset of the previous token in response to determining that the first offset is greater than the predetermined threshold offset and the second difference is not greater than the predetermined threshold offset.

Example 55 includes the subject matter of any of Examples 40-54, and wherein the means for merging the previous token and the next token further comprises means for truncating the previous token to one or more literal tokens that end at the start offset of the next token in response to determining that the first offset is not greater than the predetermined threshold offset and the second difference is greater than the predetermined threshold offset.

Example 56 includes the subject matter of any of Examples 40-55, and wherein the means for merging the previous token and the next token further comprises means for selecting between truncating the previous token to one or more literal tokens or truncating the next token to one or more literal tokens based on a scoring function in response to determining that the first offset is not greater than the predetermined threshold offset and the second difference is not greater than the predetermined threshold offset.

Example 57 includes the subject matter of any of Examples 40-56, and wherein the means for selecting based on the scoring function comprises means for selecting a fewest number of literal tokens.

The invention claimed is:

1. A computing device for data compression, the computing device comprising:
    updater circuitry to update an index data structure based on an input data stream, wherein the index data structure includes index data associated with offsets in the input data stream, and wherein the input data stream is divided into a plurality of chunks, wherein each chunk has a first length;
    a plurality of search slice circuitry, wherein respective search slice circuitry is to process a disjoint subset of the plurality of chunks of the input data stream to generate a corresponding token stream, wherein respective search slice circuitry uses the index data to process the disjoint subset of the plurality of chunks; and
    merger circuitry to merge the plurality of token streams to generate an output token stream.

2. The computing device of claim 1, wherein each chunk overlaps a previous chunk by a second length.

3. The computing device of claim 2, wherein the first length comprises 136 bytes and the second length comprises eight bytes.

4. The computing device of claim 1, wherein the plurality of chunks are striped into the plurality of disjoint subsets.

5. The computing device of claim 1, wherein to merge the plurality of token streams to generate the output token stream comprises the merger circuitry to:

read a previous token and a next token from the plurality of token streams, wherein the previous token and the next token are consecutive with respect to the input data stream;
determine whether the previous token and the next token originate from the same token stream;
output the previous token to the output token stream in response to a determination that the previous token and the next token originate from the same token stream;
copy the next token to the previous token in response to outputting of the previous token;
read the next token from the plurality of token streams in response to copying of the next token; and
merge the previous token and the next token to generate one or more synchronized tokens in response to a determination that the previous token and the next token do not originate from the same token stream.

6. The computing device of claim 5, wherein to merge the previous token and the next token comprises the merger circuitry to:
determine whether an end offset of the next token is greater than or equal to an end offset of the previous token;
read a next token from the plurality of token streams in response to a determination that the end offset of the next token is not greater than or equal to the end offset of the previous token; and
merge the previous token and the next token in response to a determination that the end offset of the next token is greater than or equal to the end offset of the previous token.

7. The computing device of claim 6, wherein to merge the previous token and the next token further comprises the merger circuitry to:
determine whether the end offset of the next token equals the end offset of the previous token; and
drop the next token in response to a determination that the end offset of the next token equals the end offset of the previous token.

8. The computing device of claim 6, wherein to merge the previous token and the next token further comprises the merger circuitry to:
determine whether a start offset of the next token is less than a start offset of the previous token;
drop the previous token in response to a determination that the start offset of the next token is less than the start offset of the previous token; and
truncate the next token to start at the start offset of the previous token in response to the determination that the start offset of the next token is less than the start offset of the previous token.

9. The computing device of claim 6, wherein to merge the previous token and the next token further comprises the merger circuitry to:
determine whether a start offset of the next token equals a start offset of the previous token; and
drop the next token in response to a determination that the start offset of the next token equals the start offset of the previous token.

10. The computing device of claim 6, wherein to merge the previous token and the next token further comprises the merger circuitry to:
determine whether a start offset of the next token is greater than a start offset of the previous token;
determine whether a first difference between the start offset of the next token and the start offset of the previous token is greater than a predetermined threshold offset in response to a determination that the start offset of the next token is greater than the start offset of the previous token;
determine whether a second difference between the end offset of the next token and the end offset of the previous token is greater than the predetermined threshold offset in response to the determination that the start offset of the next token is greater than the start offset of the previous token;
truncate the next token to a reference token that starts at the end offset of the previous token in response to a determination that the first difference is greater than the predetermined threshold offset and the second difference is greater than the predetermined threshold offset;
truncate the next token to one or more literal tokens that start at the end offset of the previous token in response to a determination that the first offset is greater than the predetermined threshold offset and the second difference is not greater than the predetermined threshold offset; and
truncate the previous token to one or more literal tokens that end at the start offset of the next token in response to a determination that the first offset is not greater than the predetermined threshold offset and the second difference is greater than the predetermined threshold offset.

11. The computing device of claim 10, wherein to merge the previous token and the next token further comprises the merger circuitry to select between truncation of the previous token to one or more literal tokens or truncation of the next token to one or more literal tokens based on a scoring function in response to a determination that the first offset is not greater than the predetermined threshold offset and the second difference is not greater than the predetermined threshold offset.

12. A method for data compression, the method comprising:
updating, by a computing device, an index data structure based on an input data stream, wherein the index data structure includes index data associated with offsets in the input data stream;
processing, by the computing device, a plurality of chunks of the input data stream in parallel to generate a plurality of token streams using the index data, wherein each chunk has a first length and each chunk overlaps a previous chunk by a second length, and wherein each token stream is generated from a corresponding disjoint subset of the plurality of chunks; and
merging, by the computing device, the plurality of token streams to generate an output token stream.

13. The method of claim 12, wherein each chunk overlaps a previous chunk by a second length.

14. The method of claim 12, wherein the plurality of chunks are striped into the plurality of disjoint subsets.

15. The method of claim 12, wherein merging the plurality of token streams to generate the output token stream comprises:
reading a previous token and a next token from the plurality of token streams, wherein the previous token and the next token are consecutive with respect to the input data stream;
determining whether the previous token and the next token originate from the same token stream;
outputting the previous token to the output token stream in response to determining that the previous token and the next token originate from the same token stream;

copying the next token to the previous token in response to outputting the previous token;

reading the next token from the plurality of token streams in response to copying the next token; and merging the previous token and the next token to generate one or more synchronized tokens in response to determining that the previous token and the next token do not originate from the same token stream.

16. The method of claim 15, wherein merging the previous token and the next token further comprises:

determining whether an end offset of the next token is greater than or equal to an end offset of the previous token;

reading a next token from the plurality of token streams in response to determining that the end offset of the next token is not greater than or equal to the end offset of the previous token; and merging the previous token and the next token in response to determining that the end offset of the next token is greater than or equal to the end offset of the previous token.

17. The method of claim 16, wherein merging the previous token and the next token further comprises:

determining whether the end offset of the next token equals the end offset of the previous token; and dropping the next token in response to determining that the end offset of the next token equals the end offset of the previous token.

18. The method of claim 16, wherein merging the previous token and the next token further comprises:

determining whether a start offset of the next token is less than a start offset of the previous token;

dropping the previous token in response to determining that the start offset of the next token is less than the start offset of the previous token; and truncating the next token to start at the start offset of the previous token in response to determining that the start offset of the next token is less than the start offset of the previous token.

19. One or more computer-readable storage media comprising a plurality of instructions that in response to being executed cause a computing device to:

update an index data structure based on an input data stream, wherein the index data structure includes index data associated with offsets in the input data stream;

process a plurality of chunks of the input data stream in parallel to generate a plurality of token streams using the index data, wherein each chunk has a first length and each chunk overlaps a previous chunk by a second length, and wherein each token stream is generated from a corresponding disjoint subset of the plurality of chunks; and merge the plurality of token streams to generate an output token stream.

20. The one or more computer-readable storage media of claim 19, wherein each chunk overlaps a previous chunk by a second length.

21. The one or more computer-readable storage media of claim 19, wherein the plurality of chunks are striped into the plurality of disjoint subsets.

22. The one or more computer-readable storage media of claim 19, wherein to merge the plurality of token streams to generate the output token stream comprises to:

read a previous token and a next token from the plurality of token streams, wherein the previous token and the next token are consecutive with respect to the input data stream;

determine whether the previous token and the next token originate from the same token stream;

output the previous token to the output token stream in response to determining that the previous token and the next token originate from the same token stream;

copy the next token to the previous token in response to outputting the previous token;

read the next token from the plurality of token streams in response to copying the next token; and merge the previous token and the next token to generate one or more synchronized tokens in response to determining that the previous token and the next token do not originate from the same token stream.

23. The one or more computer-readable storage media of claim 22, wherein to merge the previous token and the next token further comprises to:

determine whether an end offset of the next token is greater than or equal to an end offset of the previous token;

read a next token from the plurality of token streams in response to determining that the end offset of the next token is not greater than or equal to the end offset of the previous token; and merge the previous token and the next token in response to determining that the end offset of the next token is greater than or equal to the end offset of the previous token.

24. The one or more computer-readable storage media of claim 23, wherein to merge the previous token and the next token further comprises to:

determine whether the end offset of the next token equals the end offset of the previous token; and drop the next token in response to determining that the end offset of the next token equals the end offset of the previous token.

25. The one or more computer-readable storage media of claim 23, wherein to merge the previous token and the next token further comprises to:

determine whether a start offset of the next token is less than a start offset of the previous token;

drop the previous token in response to determining that the start offset of the next token is less than the start offset of the previous token; and truncate the next token to start at the start offset of the previous token in response to determining that the start offset of the next token is less than the start offset of the previous token.

* * * * *